US010097363B2

(12) United States Patent
Endoh

(10) Patent No.: US 10,097,363 B2
(45) Date of Patent: Oct. 9, 2018

(54) CONFERENCE SYSTEM

(71) Applicant: Tsuyoshi Endoh, Kanagawa (JP)

(72) Inventor: Tsuyoshi Endoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 123 days.

(21) Appl. No.: 15/218,174

(22) Filed: Jul. 25, 2016

(65) Prior Publication Data

US 2017/0033940 A1 Feb. 2, 2017

(30) Foreign Application Priority Data

Jul. 31, 2015 (JP) ................................ 2015-152458

(51) Int. Cl.

| | |
|---|---|
| ***H04W 84/12*** | (2009.01) |
| ***H04L 12/18*** | (2006.01) |
| ***H04W 64/00*** | (2009.01) |
| ***H04W 4/06*** | (2009.01) |
| ***H04M 3/56*** | (2006.01) |
| ***H04W 4/80*** | (2018.01) |

(52) U.S. Cl.

CPC ........ *H04L 12/1818* (2013.01); *H04M 3/563* (2013.01); *H04W 4/06* (2013.01); *H04W 4/80* (2018.02); *H04W 64/006* (2013.01)

(58) Field of Classification Search

CPC ......... H04W 4/06; H04W 4/00; H04W 64/00; H04W 4/008; H04W 64/006; H04M 3/56; H04M 3/563

See application file for complete search history.

(56) References Cited

U.S. PATENT DOCUMENTS

| | | | |
|---|---|---|---|
| 7,502,141 | B2 | 3/2009 | Kowada et al. |
| 7,518,742 | B2 | 4/2009 | Toyonori et al. |
| 7,537,205 | B2 | 5/2009 | Nagata et al. |
| 8,046,702 | B2 | 10/2011 | Endoh |
| 8,314,969 | B2 | 11/2012 | Endoh et al. |
| 8,712,315 | B2 | 4/2014 | Endoh et al. |
| 8,984,426 | B2 | 3/2015 | Endoh et al. |

(Continued)

FOREIGN PATENT DOCUMENTS

| | | |
|---|---|---|
| JP | 2012-181597 | 9/2012 |
| JP | 2013-239047 | 11/2013 |

*Primary Examiner* — Andrew Lee

(74) *Attorney, Agent, or Firm* — IPUSA, PLLC

(57) ABSTRACT

A conference system including a first communication apparatus, a second communication apparatus, and an information processing apparatus is provided. The information processing apparatus includes a memory storing a program and a processor configured to execute the program to implement a process of managing a conference area of a conference. When the processor receives a participation notification to participate in the conference from an information terminal via the first communication apparatus having a first communication range that covers the conference area of the conference and receives a notification from the second communication apparatus that the information terminal is located within a second communication range of the second communication apparatus, the processor implements a process of extending the conference area of the conference to include an extended area covered by the second communication range of the second communication apparatus.

19 Claims, 19 Drawing Sheets

(56) References Cited

U.S. PATENT DOCUMENTS

| | | | | |
|---|---|---|---|---|
| 2008/0181140 | A1* | 7/2008 | Bangor | H04L 12/1818 370/261 |
| 2009/0111443 | A1* | 4/2009 | Gupta | H04M 1/72519 455/416 |
| 2013/0029468 | A1* | 1/2013 | Park | H01L 27/2454 438/382 |
| 2013/0258908 | A1* | 10/2013 | Martinsen | H04L 12/1818 370/260 |
| 2014/0226651 | A1* | 8/2014 | Lim | H04W 84/18 370/350 |
| 2015/0146683 | A1* | 5/2015 | Cazanas | H04W 36/18 370/331 |
| 2015/0147079 | A1 | 5/2015 | Iwata et al. | |
| 2015/0264314 | A1* | 9/2015 | Goesnar | H04L 12/1818 348/14.08 |
| 2016/0014370 | A1* | 1/2016 | Xie | H04N 7/152 348/14.02 |
| 2016/0080433 | A1* | 3/2016 | Liu | H04M 1/7253 370/261 |
| 2016/0261648 | A1* | 9/2016 | Ruetschi | G06F 17/275 |
| 2017/0164246 | A1* | 6/2017 | Ganu | H04W 36/0061 |
| 2017/0208641 | A1* | 7/2017 | Lee | H04W 48/10 |

* cited by examiner

| CONFERENCE ID | CONFERENCE NAME | CONFERENCE TIME | CONFERENCE LOCATION | BASIC ACCESS POINT ID | EXTENDED ACCESS POINT ID | CONFERENCE PARTICIPATING INFORMATION TERMINAL ID | USER ID | CONFERENCE DATA | | | |
|---|---|---|---|---|---|---|---|---|---|---|---|
| | | | | | | | | AGENDA | HANDOUT | MINUTES | TOPIC |
| 001 | APP MEASURE DELIBERATION CONFERENCE | 2015/02/13 15:00-16:30 | 2F COLLAB SPACE | AP20-1 AP20-2 | AP20-3 | INFORMATION TERMINAL 30A | USER A | AGENDA A | HANDOUT A | MINUTES A | TOPIC A |
| | | | | | | INFORMATION TERMINAL 30B | USER B | | | | |
| | | | | | | INFORMATION TERMINAL 30C | USER C | | | | |
| | | | | | | INFORMATION TERMINAL 30D | USER D | | | | |
| | | | | | | INFORMATION TERMINAL 30E | USER E | | | | |
| | | | | | | INFORMATION TERMINAL 30F | USER F | | | | |
| 002 | DEVELOPMENT METHOD INFORMATION SHARING CONFERENCE | 2015/02/13 15:00-16:00 | 2F COLLAB SPACE | AP20-5 AP20-7 | | INFORMATION TERMINAL 30P | USER P | AGENDA B | HANDOUT B | MINUTES B | TOPIC B |
| | | | | | | INFORMATION TERMINAL 30Q | USER Q | | | | |
| | | | | | | INFORMATION TERMINAL 30R | USER R | | | | |
| | | | | | | INFORMATION TERMINAL 30S | USER S | | | | |
| | | | | | | ... | ... | | | | |
| ... | ... | ... | ... | ... | ... | ... | ... | ... | ... | ... | ... |

| ACCESS POINT ID | INFORMATION TERMINAL ID | STANDARD OCCUPANCY NUMBER |
|---|---|---|
| AP20-1 | INFORMATION TERMINAL 30A<br>INFORMATION TERMINAL 30B<br>INFORMATION TERMINAL 30C | 4 |
| AP20-2 | INFORMATION TERMINAL 30C<br>INFORMATION TERMINAL 30D | 4 |
| AP20-3 | INFORMATION TERMINAL 30A<br>INFORMATION TERMINAL 30E<br>INFORMATION TERMINAL 30F | 5 |
| AP20-4 | – | 5 |
| AP20-5 | INFORMATION TERMINAL 30P<br>INFORMATION TERMINAL 30Q<br>... | 6 |
| AP20-6 | – | 4 |
| AP20-7 | INFORMATION TERMINAL 30R<br>INFORMATION TERMINAL 30S<br>... | 5 |
| AP20-8 | – | 5 |
| ... | ... | ... |

■ CONFERENCE INFORMATION    ✕

CONFERENCE NAME
    APP MEASURE DELIBERATION CONFERENCE

DATE/TIME     2015/02/13(FRI) 15:00-16:30
LOCATION      2F COLLAB SPACE
AP            20-1, 20-2, 20-3

PARTICIPANTS  ○○ ○○, ×× ×, △△ △△

DISCUSSION CONTENT
DISCUSS MEASURES FOR RESPONDING TO DESIGN
EVALUATION AND CLARIFY METHOD AND DATE OF
IMPLEMENTING THE MEASURES.

WILL YOU PARTICIPATE IN THE CONFERENCE?

YES        NO 311        312

CONFERENCE SYSTEM

CROSS-REFERENCE TO RELATED APPLICATIONS

The present application claims priority under 35 U.S.C. § 119 to Japanese Patent Application No. 2015-152458 filed on Jul. 31, 2015, the entire contents of which are incorporated herein by reference.

BACKGROUND OF THE INVENTION

1. Field of the Invention

The present disclosure relates to a conference system.

2. Description of the Related Art

For example, Japanese Unexamined Patent Publication No. 2012-181597 describes a technique for dividing a conference area into a plurality of areas based on boundary position information received from a boundary position information transmitting apparatus, and delivering conference materials to a conference participant according to the area in which the participant is located.

SUMMARY OF THE INVENTION

According to one embodiment of the present invention, a conference system is provided that includes a first communication apparatus, a second communication apparatus, and an information processing apparatus. The first communication apparatus and the second communication apparatus each include a short-range wireless communication unit configured to establish short-range wireless communication with an information terminal that is located within a first communication range of the first communication apparatus and/or a second communication range of the second communication apparatus, a communication unit configured to notify the information processing apparatus of the information terminal that is located within the first communication range of the first communication apparatus and/or the second communication range of the second communication apparatus. The information processing apparatus includes a memory storing a program and a processor configured to execute the program to implement a process of managing a conference area of a conference. When the processor receives a participation notification to participate in the conference from the information terminal via the first communication apparatus with the first communication range that covers the conference area of the conference and receives a notification from the second communication apparatus that the information terminal is located within the second communication range of the second communication apparatus, the processor implements a process of extending the conference area of the conference to include an extended area covered by the second communication range of the second communication apparatus.

BRIEF DESCRIPTION OF THE DRAWINGS

FIG. 7 is a table illustrating example information items stored as conference information;

FIG. 8 is a table illustrating example information items stored as in-range information;

DESCRIPTION OF THE EMBODIMENTS

In the following, embodiments of the present invention are described with reference to the accompanying drawings.

Figure 1:
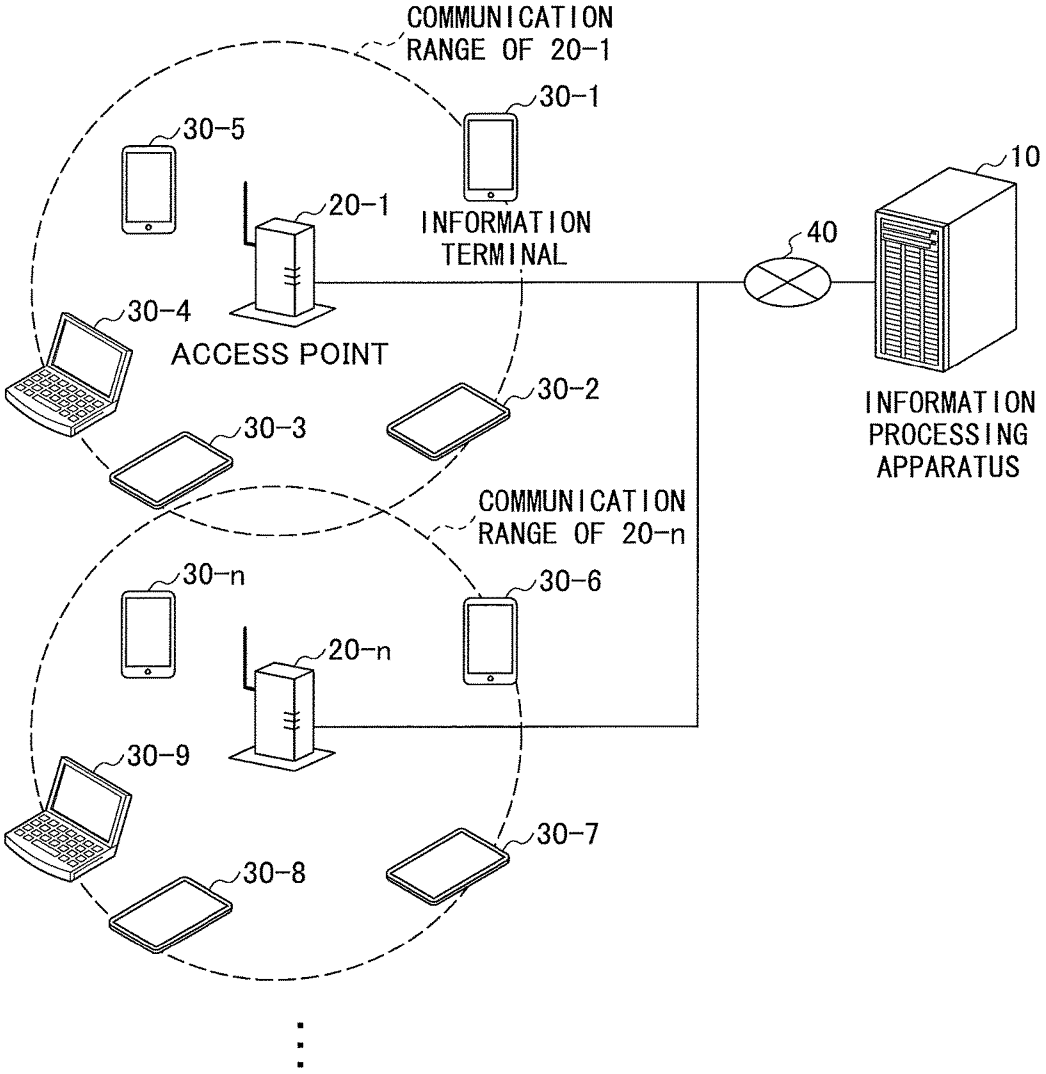
FIG. 1 is a diagram illustrating an overall configuration of a conference system according to an embodiment of the present invention.

FIG. 1 is a diagram illustrating an example overall configuration of a conference system 1 according to an embodiment of the present invention. In FIG. 1, the conference system 1 includes at least one information processing apparatus (management server) 10, at least one access point (communication apparatus) 20-1, . . . , **20-*n* (hereinafter generically referred to as "access point 20"), at least one information terminal 30-1, . . . , 30-*n* (hereinafter generically referred to as "information terminal 30**").

Note that in the following descriptions, an access point 20 with a communication range covering an area that is originally scheduled to be a conference area where a conference is to be held is referred to as "basic access point". Also, an access point 20 with a communication range covering an area that is not originally scheduled to be used as the conference area but has one or more information terminals 30 participating in the conference located therein due to crowding of the originally scheduled conference area, for example, is referred to as "extended access point".

The information processing apparatus 10 manages a conference area of a conference.

The information processing apparatus 10 receives a participation notification to participate in a conference from an information terminal 30 via an access point 20 with a communication range covering the conference area of the conference. Also, when the information processing apparatus 10 receives notification from another access point 20 that the information terminal 30 is located within the communication range of the other access point 20, the information processing apparatus 10 extends the conference area to cover the communication range of the other access point 20. Note that the information processing apparatus 10 may receive the participation notification to participate in the conference from the information terminal 30 either before or after receiving the notification from the other access point 20 that the information terminal 30 is located within the communication range of the other access point 20.

The information processing apparatus 10 transmits conference data to the information terminal 30 that is located within a conference area of a conference.

The access point 20 establishes short-range wireless communication with an information terminal 30 that enters a short-range wireless communication range of the access point 20. For example, the access point 20 may establish BLE (Bluetooth (registered trademark) Low Energy) communication, wireless LAN (Local Area Network) communication, or NFC (Near field communication) with the information terminal 30 that enters the short-range wireless communication range of the access point 20. In this respect, the access point 20 is an example of a communication apparatus for communicating with another apparatus.

When the access point 20 detects, through short-range wireless communication, that an information terminal 30 has entered or exited the short-range wireless communication range of the access point 20, the access point 20 notifies the information processing apparatus 10 of the detected connection status of the information terminal 30.

The access point 20 communicates with the information processing apparatus 10 via a transmission network 40. The transmission network 40 may be a LAN, the Internet, or a cell phone network, for example.

The information terminal 30 may be a smartphone, a tablet computer, a notebook PC (personal computer), or some other device carried by a user, for example. The information terminal 30 establishes wireless communication with an access point 20 to acquire content such as reference materials from the information processing apparatus 10. The content is delivered to the information terminal 30 according to the current location of the information terminal 30. The information terminal 30 then displays the acquired content to the user of the information terminal 30.

Figure 2:
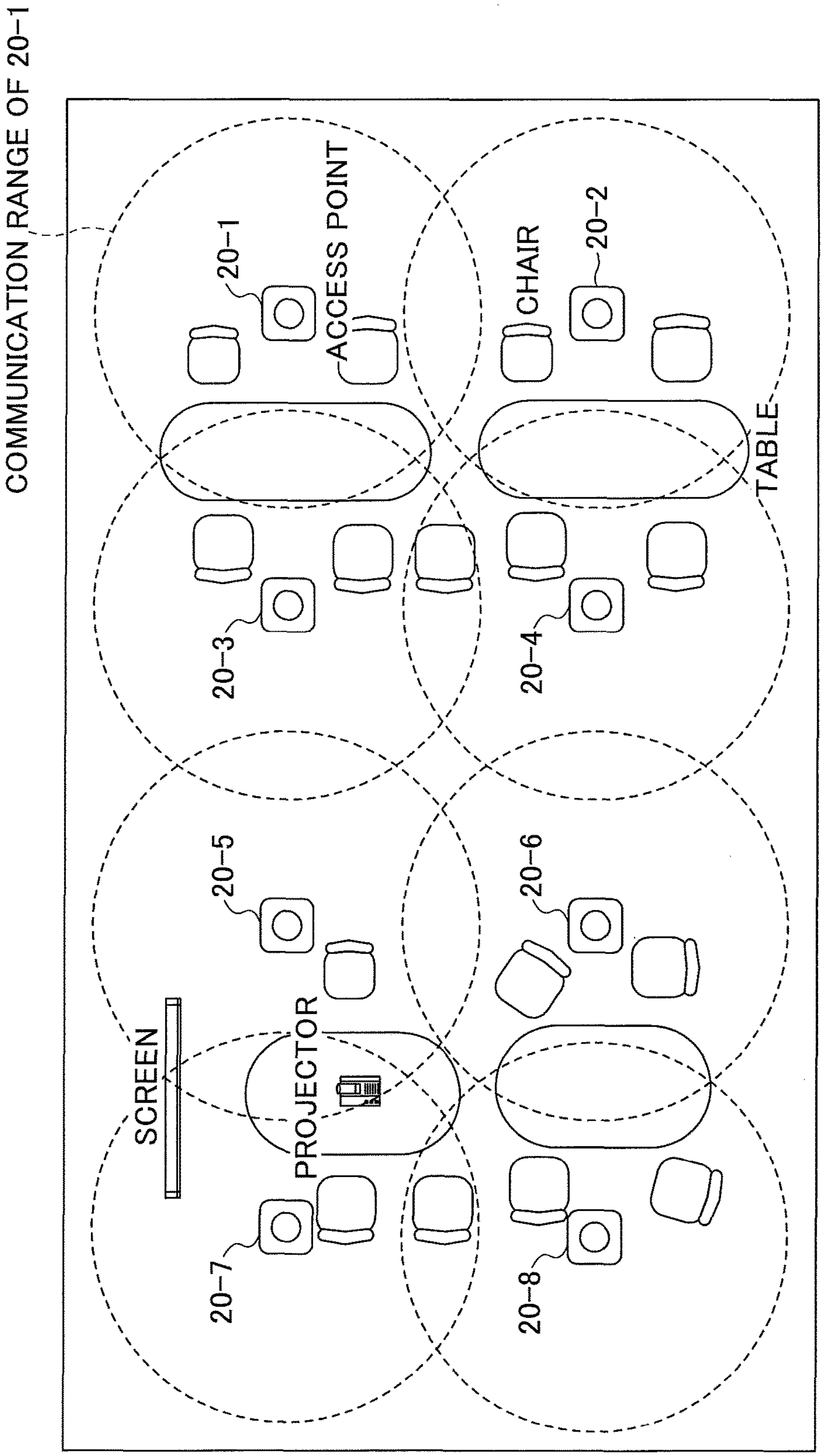
FIG. 2 is a diagram illustrating an example arrangement of access points according to an embodiment of the present invention.

FIG. 2 is a diagram illustrating an example arrangement of access points 20 according to an embodiment of the present invention. In FIG. 2, the communication ranges of the access points 20 are arranged to slightly overlap with each other at certain locations in order to cover the entire conference area.

Figure 3:
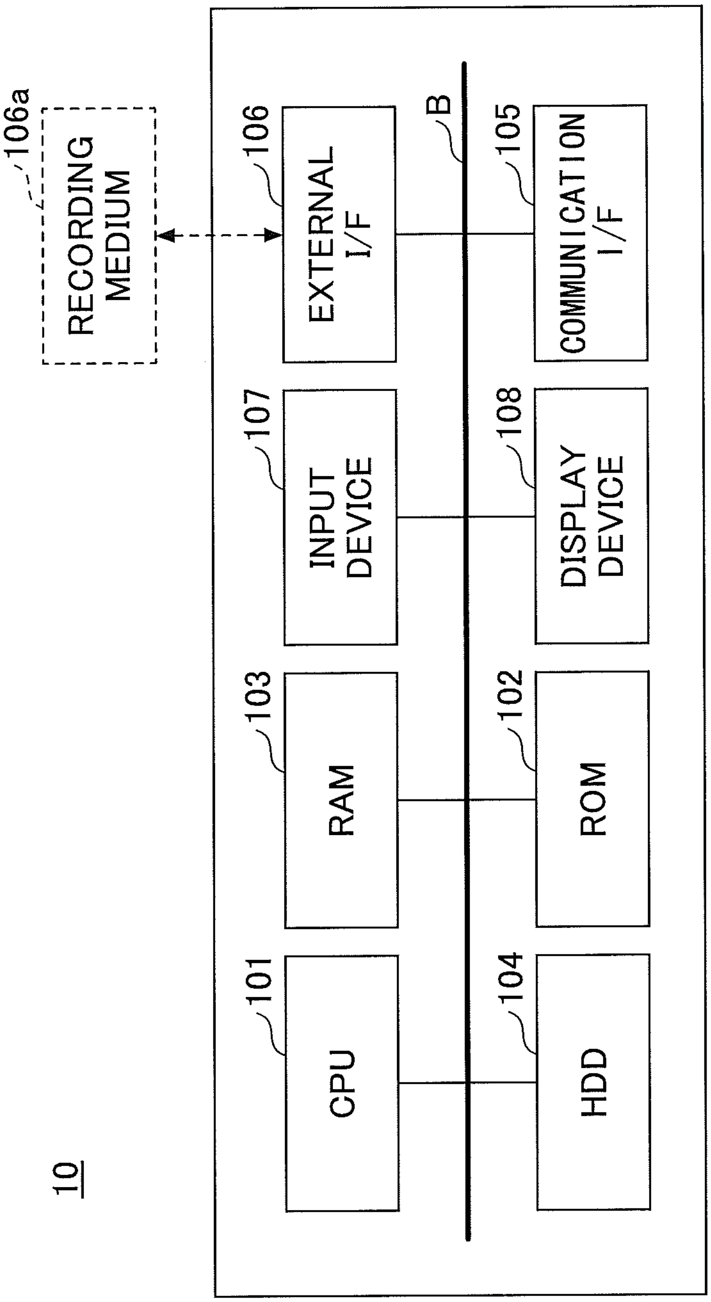
FIG. 3 is a block diagram illustrating an example hardware configuration of an information processing apparatus.

FIG. 3 is a block diagram illustrating an example hardware configuration of the information processing apparatus 10.

The information processing apparatus 10 includes a CPU (Central Processing Unit) 101, a ROM (Read Only Memory) 102, a RAM (Random Access Memory) 103, an HDD (Hard Disk Drive) 104, a communication interface (I/F) 105, an external I/F 106, an input device 107, and a display device 108 that are connected to each other by a bus B.

The CPU 101 is a processor that implements overall control and functions of the information processing apparatus 10 by loading programs and data read from a storage device such as the ROM 102 in the RAM 103, and executing processes based on the loaded programs and data.

The ROM 102 is a nonvolatile semiconductor memory (storage device) that is capable of retaining programs and data even when the power is turned off. The ROM 102 may store programs and data, such as BIOS (Basic Input/Output System) and OS settings, for example.

The RAM 103 is a volatile semiconductor memory (storage device) for temporarily storing programs and data.

The HDD 104 stores programs and data, such as an OS (Operating System) and various application programs for implementing various functions.

The communication I/F 105 uses the Ethernet (registered trademark) standard to establish communication.

The external I/F 106 is an interface with an external device. The external device may be a recording medium **106*a*, for example. The recording medium 106*a* may store a program for implementing a process according to the present embodiment. The information processing apparatus 10 may perform data reading and/or writing operations on the recording medium 106*a* via the external I/F 106**, for example.

The recording medium **106*a* may be a storage device such as an SD memory card. The recording medium 106*a*** may also be some other type of storage device, such as a USB memory (Universal Serial Bus memory), a DVD (Digital Versatile Disk), a CD (Compact Disk), or a flexible disk, for example.

The input device 107 is an interface for inputting various items of information to the information processing apparatus 10. The display device 108 displays various items of information held by the information processing apparatus 10.

Figure 4:
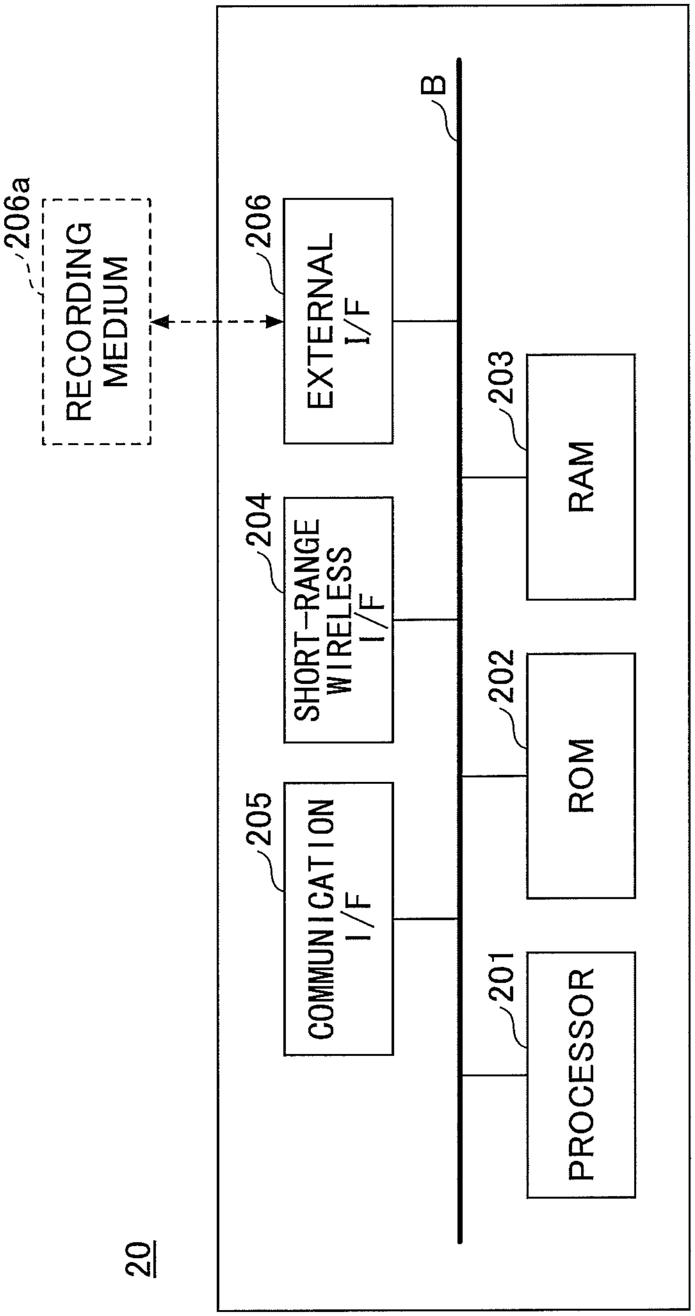
FIG. 4 is a block diagram illustrating an example hardware configuration of the access point.

FIG. 4 is a block diagram showing an example hardware configuration of the access point 20.

The access point 20 includes a processor 201, a ROM 202, a RAM 203, a short-range wireless I/F 204, a communication I/F 205, and an external I/F 206 that are connected to each other by a bus B.

The processor 201 is a processor that implements overall control and functions of the access point 20 by loading programs and data read from a storage device such as the ROM 202 in the RAM 203 and executing processes based on the loaded programs and data.

The ROM 202 is a nonvolatile semiconductor memory (storage device) such as a flash memory that is capable of retaining programs and data even when the power is turned off. The ROM 202 may store programs and data, such as an OS and various application programs for implementing various functions, for example.

The RAM 203 is a volatile semiconductor memory (storage device) for temporarily storing programs and data.

The short-range wireless I/F 204 establishes short-range wireless communication using wireless technology, such as the BLE, the NFC, or a wireless LAN, for example.

The communication I/F 205 uses the Ethernet (registered trademark) standard to establish communication with the information processing apparatus 10.

The external I/F 206 is an interface with an external device. The external device may be a recording medium **206*a*, for example. The access point 20 may perform data reading and/or writing operations on the recording medium 206*a* via the external I/F 206, for example. The recording medium 206*a*** may be a flexible disk, a CD, a DVD, an SD memory card, or a USB memory, for example.

Figure 5:
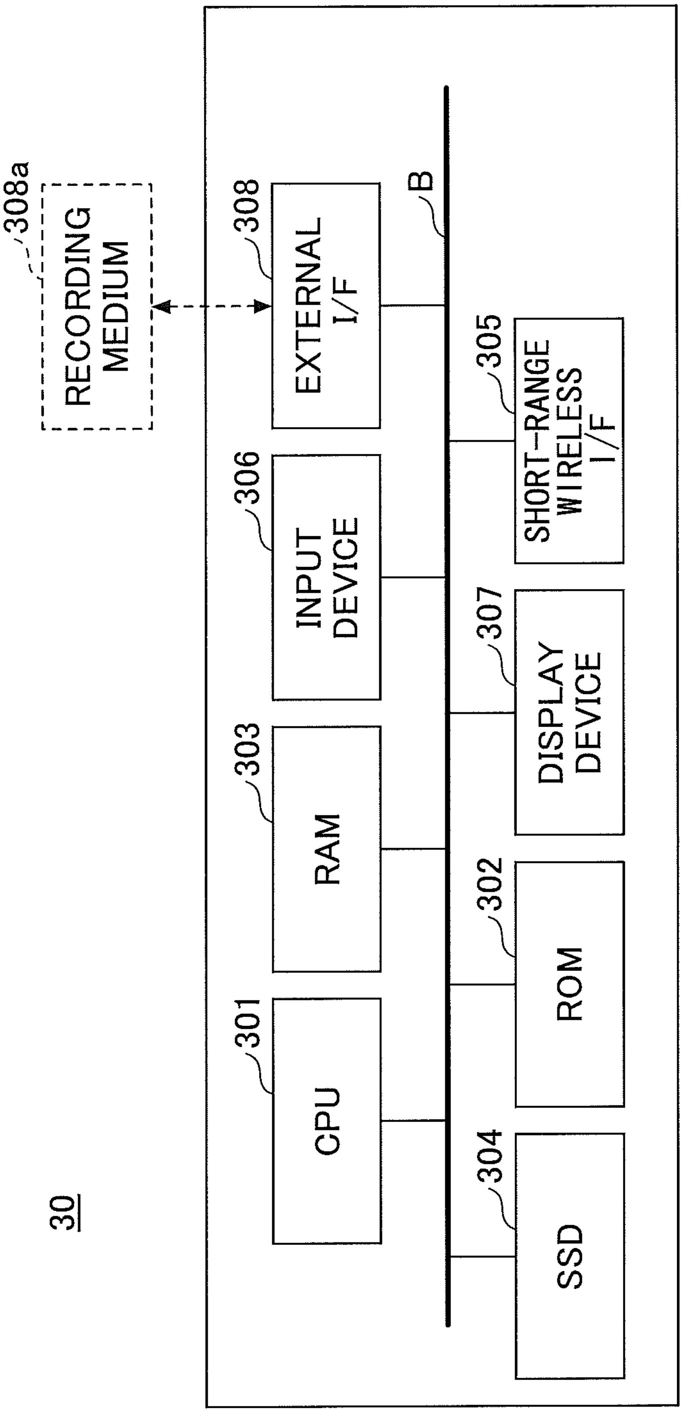
FIG. 5 is a block diagram illustrating an example hardware configuration of an information terminal.

FIG. 5 is a diagram showing an example hardware configuration of the information terminal 30.

The information terminal 30 includes a CPU (Central Processing Unit) 301, a ROM (Read Only Memory) 302, a RAM (Random Access Memory) 303, an SSD (Solid State Drive) 304, a short-range wireless I/F 305, an input device 306, a display device 307, and an external I/F 308 that are connected to each other by a bus B.

The CPU 301 is a processor that implements overall control and functions of the information terminal 30 by loading programs and data read from a storage device, such as the ROM 302 or the SSD 304, in the RAM 303, and executing processes based on the loaded programs and data.

The ROM 302 is a non-volatile semiconductor memory (storage device) that is capable of retaining programs and data even when the power is turned off. The ROM 302 may store programs and data, such as BIOS (Basic Input/Output System) that is executed when the information terminal 30 is started, OS settings, and network settings, for example.

The RAM 303 is a volatile semiconductor memory (storage device) for temporarily storing programs and data.

The SSD 304 is a nonvolatile storage device that stores programs and data. For example, the SSD 304 may store programs and data, such as an OS (Operating System) corresponding to basic software for controlling the entire information terminal 30, and application software run on the OS for implementing various functions. The programs and data stored in the SSD 304 may be managed by a predetermined file system and/or a DB (database), for example. Note that in some embodiments, the information terminal 30 may include an HDD (Hard Disk Drive) in addition to or instead of the SSD 304, for example.

The short-range wireless I/F 305 is an interface for establishing communication via the access point 20. The short-range wireless I/F 305 may use wireless technology, such as the BLE, the NFC, or a wireless LAN, to establish short-range wireless communication with the access point 20.

The input device 306 may include a touch panel, for example, and is used to input operation signals to the information terminal 30. The input device 306 may also include a keyboard and/or a mouse, for example.

The display device 307 may include a LCD (Liquid Crystal Display), for example, that displays processing results of the information terminal 30.

The external I/F 308 is an interface with an external device. The external device may be a recording medium **308*a*, for example. The recording medium 308*a* may store a program for implementing a process according to the present embodiment. The information terminal 30 may perform data reading and/or writing operations on the recording medium 308*a* via the external I/F 308**, for example.

The recording medium **308*a* may be a storage device such as an SD memory card, for example. The recording medium 308*a*** may also be some other type of storage device, such as a USB (Universal Serial Bus) memory, a DVD (Digital Versatile Disk), a CD (Compact Disk), or a flexible disk, for example.

Figure 6:
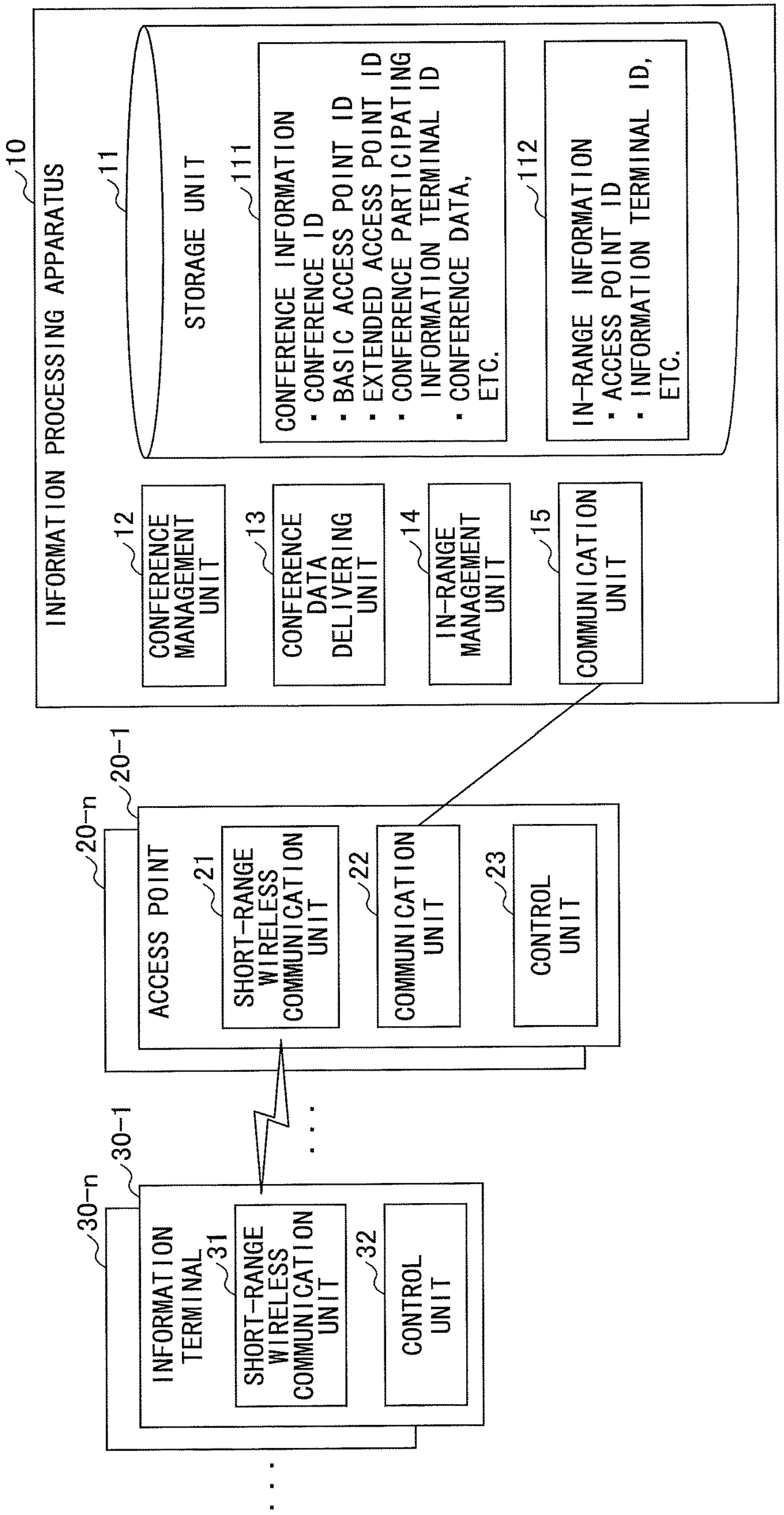
FIG. 6 is a block diagram illustrating an example functional configuration of the conference system according to an embodiment of the present invention.

In the following, referring to FIG. 6, the functional configuration of the conference system 1 according to the present embodiment is described. FIG. 6 is a block diagram illustrating an example functional configuration of the conference system 1 according to the present embodiment.

In FIG. 6, the information processing apparatus 10 includes a storage unit 11, a conference management unit 12, a conference data delivering unit 13, an in-range management unit 14, and a communication unit 15. These units may be implemented by processes executed by the CPU 101 of the information processing apparatus 10 based on one or more programs installed in the information processing apparatus 10, for example.

The storage unit 11 stores conference information 111 and in-range information 112. The storage unit 11 may be configured to store data in the RAM 103 of the information processing apparatus 10, or the storage unit 11 may be configured to store data in an external database server, for example.

FIG. 7 is a table indicating example information items stored as the conference information 111. The conference information 111 may include information items, such as "conference ID", "conference name", "conference time", "conference location", "basic access point ID", "extended access point ID", "conference participating information terminal ID", "user ID", "agenda", "handout", "minutes", and "topic", for example.

The "conference ID" is information identifying a conference. The "conference name" is information indicating the name of the conference. The "conference time" is information indicating the scheduled start time and end time of the conference. The "conference location" is information indicating the name of the location where the conference is to be held. The "basic access point ID" is information identifying the access point 20 with a communication range covering an area originally scheduled to be used as the conference area where the conference is to be held. The "extended access point ID" is information identifying the access point 20 with a communication range covering an extended area that was not originally scheduled for use as the conference area but has information terminals 30 of users participating in the conference located therein due to crowding of the conference location used to hold the conference, for example. Note that a MAC address of the access point 20 may be used as the information identifying the access point 20, for example.

The "conference participating information terminal ID" is information identifying the information terminals 30 participating in the conference. For example, a MAC address of the information terminal 30 participating in the conference may be used as the information identifying the conference participating information terminal 30. The "user ID" is information identifying the user of the information terminal 30 participating in the conference. The "agenda", "handout", and "minutes" are information relating to the "topic" describing action items of the conference. Note that the "minutes" may be configured to include the user ID of the information terminal 30 that has transmitted a participation notification to participate in the conference, for example.

FIG. 8 is a table indicating example information items stored as the in-range information 112. The in-range information 112 may include information items, such as "access point ID", "information terminal ID", and "standard occupancy number", for example.

The "access point ID" is information identifying the access point 20. The "information terminal ID" is information identifying the information terminals 30 that are located within the communication range of the access point 20 and is wirelessly connected to the access point 20 through short-range wireless communication. Note that in a case where a given information terminal 30 is located in an area where the communication ranges of a plurality of access points 20 overlap, the information identifying the given information terminal 30 may be stored in association with the plurality of access points 20. The "standard occupancy number" is information indicating a threshold number of information terminals 30 that can be connected to the access point 20.

Referring back to FIG. 6, when the in-range management unit 14 receives a connection notification including an information terminal ID and an access point ID from an access point 20 via the communication unit 15, the in-range management unit 14 registers the received information terminal ID in association with the received access point ID in the in-range information 112.

When the in-range management unit 14 receives a disconnection notification including an information terminal ID and an access point ID from an access point 20 via the communication unit 15, the in-range management unit 14 deletes the received information terminal ID associated with the received access point ID from the in-range information 112.

When the conference management unit 12 receives a connection notification including an information terminal ID and an access point ID from an access point 20 via the communication unit 15, the conference management unit 12 performs an addition process for adding an information terminal 30 and/or an access point 20 in the conference information 111 after the in-range management unit 14 performs the process of updating the in-range information 112. For example, in an addition process for adding an information terminal 30 participating in a given conference, the conference management unit 12 may register the information terminal ID of the information terminal 30 in association with the given conference in the conference information 111. Also, in an addition process for adding an access point 20 as an extended access point for a given conference, the conference management unit 12 may register the access point ID of the access point 20 as an extended access point ID in association with the given conference in the conference information 111. Note that the addition process for adding an information terminal 30 and/or an access point 20 are described in detail below.

When the conference management unit 12 receives a disconnection notification including an information terminal ID and an access point ID from an access point 20 via the communication unit 15, the conference management unit 12 performs a deletion process for deleting an information terminal 30 and/or an access point 20 from the conference information 111 after the in-range management unit 14 performs the process of updating the in-range information 112. For example, in a deletion process for deleting an information terminal 30, the conference management unit 12 may delete the information terminal ID of the information terminal 30 that is registered as a conference participating information terminal 30 in association with a given conference from the conference information 111. Also, in a deletion process for deleting an access point 20, the conference management unit 12 may delete the access point ID of the access point 20 that is registered as an extended access point 20 in association with a given conference from the conference information 111. Note that the deletion process for deleting an information terminal 30 and/or an access point 20 is described in detail below.

The conference management unit 12 also performs a move request notification process periodically or in response to receiving a disconnection notification including an information terminal ID and an access point ID from an access point 20 via the communication unit 15.

In the move request notification process, the conference management unit 12 may acquire the number of information terminals 30 participating in a conference that are located within the communication range of the basic access point for the conference, and the number of information terminals 30 participating in the conference that are located within the communication range of the extended access point for the conference. Then, depending on the acquired numbers, the conference management unit 12 may send a message for prompting the information terminals 30 located within the communication range of the extended access point to move to the communication range of the basic access point, for example. Note that the move request notification process implemented by the conference management unit 12 is described in detail below.

When the conference data delivering unit 13 receives a connection notification of a connection established with an information terminal 30 from an access point 20 that is registered as a basic access point or an extended access point for a given conference, the conference data delivering unit 13 refers to the conference information 111 to determine whether the information terminal 30 associated with the access point 20 is already participating in the conference. If the information terminal 30 is not yet participating in the conference, the conference data delivering unit 13 sends conference data relating to the given conference to the information terminal 30. Note that the conference data delivered to the information terminal 30 at this time may include information for determining whether the user of the information terminal 30 is to participate in the conference.

Also, the conference data delivering unit 13 refers to the conference information 111 and delivers conference data relating to a conference to an information terminal 30 that is participating in the conference when the conference data delivering unit 13 receives a request from the information terminal 30 or when the conference data is changed, for example.

The communication unit 15 establishes communication with the access point 20.

The access point 20 includes a short-range wireless communication unit 21, a communication unit 22, and a control unit 23. These units may be implemented by the processor 201 of the access point 20 executing processes based on one or more programs that are installed in the access point 20, for example.

The short-range wireless communication unit 21 controls the short-range wireless I/F 204 to establish a connection with an information terminal 30 using short-range wireless technology, such as the BLE, the NFC, or a wireless LAN, when the information terminal 30 enters the short-range wireless communication range of the access point 20.

The communication unit 22 controls the communication I/F 205 to establish communication with the information processing apparatus 10.

The control unit 23 sends a connection notification including an information terminal ID and an access point ID to the information processing apparatus 10 when the short-range wireless communication unit 21 detects that an information terminal 30 has entered the short-range wireless communication range of the access point 20. Also, the control unit 23 sends a disconnection notification including an information terminal ID and an access point ID to the information processing apparatus 10 when the short-range wireless communication unit 21 detects that an information terminal 30 has exited the short-range wireless communication range of the access point 20.

The information terminal 30 includes a wireless communication unit 31 and a control unit 32. These units may be implemented by the CPU 301 of the information terminal 30 executing processes based on one or more programs installed in the information terminal 30, for example.

The short-range wireless communication unit 31 controls the short-range wireless I/F 305 and uses short-range wireless technology, such as the BLE, the NFC, or a wireless LAN, to establish communication with the access point 20 when the information terminal 30 enters the short-range wireless communication range of the access point 20.

The control unit 33 sends a participation notification including the information terminal ID of the information terminal 30 upon accepting a user operation for participating in a conference via the input device 306.

Figure 9:
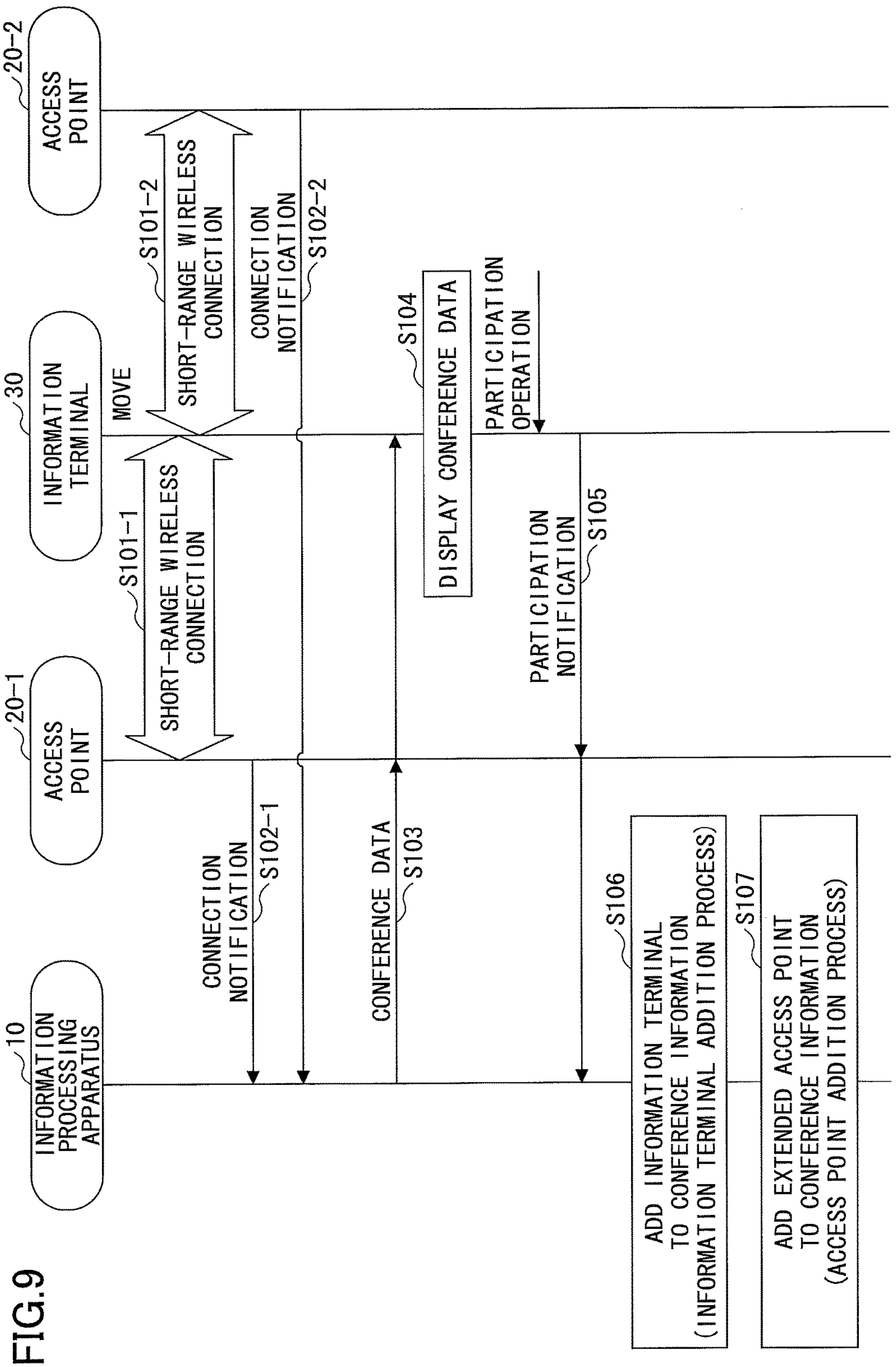
FIG. 9 is a sequence chart illustrating an example process sequence for extending a conference area.

In the following, referring to FIG. 9, operations of the conference system 1 are described with respect to a case where a user carrying an information terminal 30 who wishes to participate in a conference moves to an area where the communication range of an access point 20-1 that is registered as a basic access point for the conference and the communication range of an access point 20-2 that is not associated with the conference overlap. FIG. 9 is a sequence chart illustrating an example process sequence for extending a conference area.

In step S101-1, the information terminal 30 establishes short-range wireless communication with the access point 20-1. In step S102-1, the access point 20-1 notifies the information processing apparatus 10 that a connection has been established with the information terminal 30.

In step S101-2, the information terminal 30 establishes short-range wireless communication with the access point 20-2. In step S102-2, the access point 20-2 notifies the information processing apparatus 10 that a connection has been established with the information terminal 30. Note that the execution order of step S101-1 and step S101-2 is not particularly limited. That is, step S101-1 may be executed either before or after step S101-2.

In step S103, the information processing apparatus 10 transmits conference data for determining whether to participate in the conference to the information terminal 30 via the access point 20-1. In step S104, the information terminal 30 displays the received conference data.

In step S105, the information terminal 30 transmits a participation notification to the information processing apparatus 10 via the access point 20-1 upon accepting an operation for participating in the conference from the user. In step S106, the information processing apparatus 10 performs an addition process for adding the information terminal 30 as described below to register the information terminal 30 in association with the conference in the conference information 111. Note that in some embodiments, when the information processing apparatus 10 receives the connection notification of a connection established with the information terminal 30 from the access point 20-1 in step S101-1, the information processing apparatus 10 may be configured to automatically register the information terminal 30 in association with the conference. In this case, the user operation for participating in the conference may be unnecessary.

In step S107, the information processing apparatus 10 performs an addition process for adding the access point 20-2 as described below to register the access point 20-2 in association with the conference as an extended access point in the conference information 111.

While the access point 20-2 is registered as an extended access point, the information terminal 30 connected to the access point 20-2 is able to receive conference data from the conference data delivering unit 13 of the information processing apparatus 10 so that it can participate in the conference.

Figure 10:
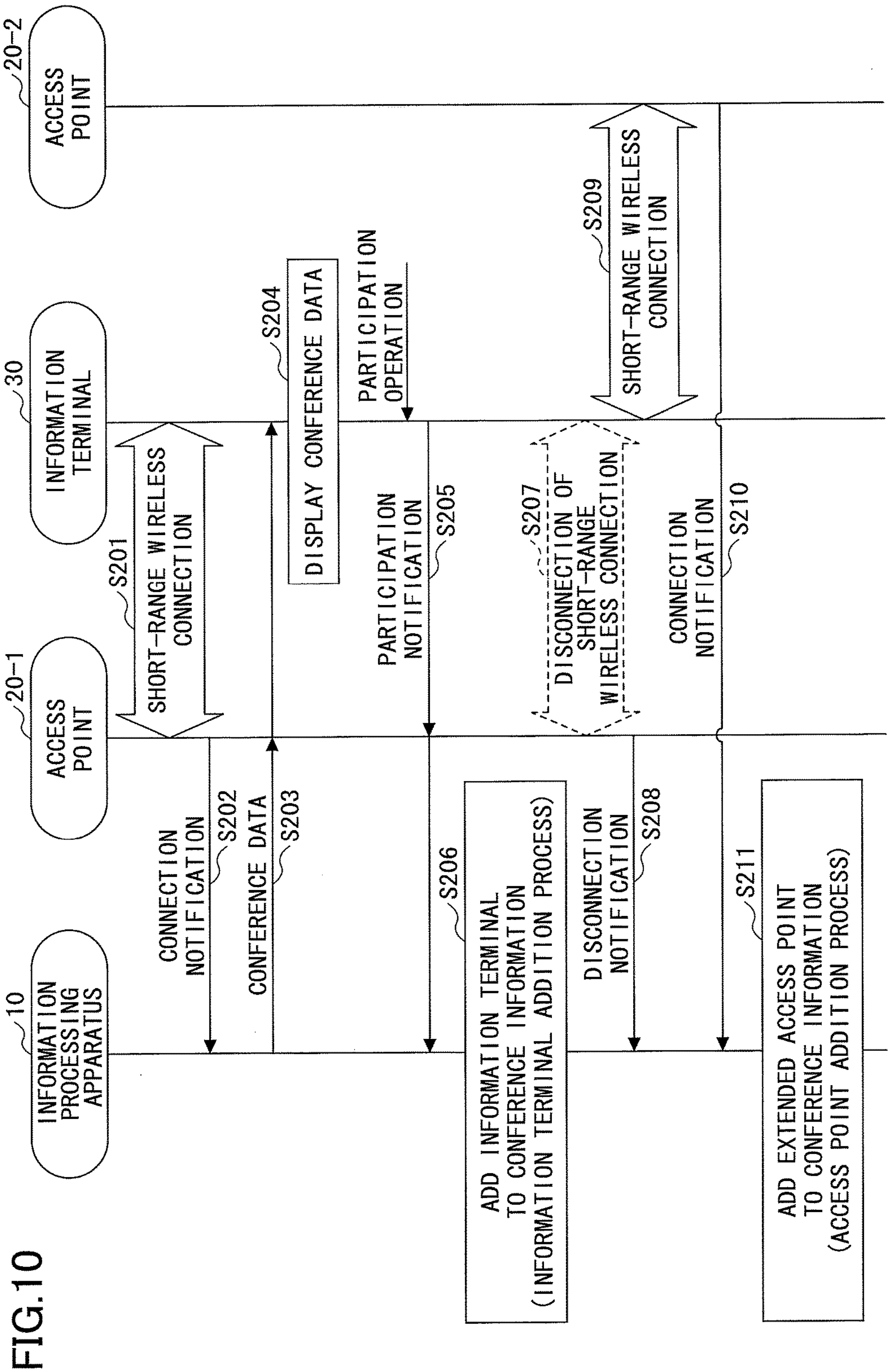
FIG. 10 is a sequence chart illustrating another example process sequence for extending the conference area.

In the following, referring to FIG. 10, operations of the conference system 1 are described with respect to a case where a user carrying an information terminal 30 moves to the communication range of the access point 20-1 that is registered as a basic access point for a conference in order to participate in the conference and thereafter moves to the communication range of the access point 20-2 that is not associated with the conference. FIG. 10 is a sequence chart illustrating another example process sequence for extending the conference area.

In steps S201 through S206, the information terminal 30 establishes short-range wireless communication with the access point 20-1, and the information processing apparatus 10 registers the information terminal 30 in the conference information 111 in response to an operation for participating in the conference input by the user. Note that the above steps S201 through S206 may be substantially identical to steps S101-1, S102-1, and steps S103 through S106 of FIG. 9, and as such, detailed descriptions thereof will be omitted.

When the information terminal 30 moves out of the communication range of the access point 20-1 to move into the communication range of the access point 20-2 that is not associated with the conference, the short-range wireless communication between the information terminal 30 and the access point 20-1 is disconnected (step S207). In turn, the access point 20-1 notifies the information processing apparatus 10 of the disconnection of the information terminal 30 (step S208). When the user carrying the information terminal 30 moves into the communication range of the access point 20-2, the information terminal 30 establishes short-range wireless communication with the access point 20-2 (step S209). In turn, the access point 20-2 notifies the information processing apparatus 10 of the connection that has been established with the information terminal 30 (step S210).

The information processing apparatus 10 performs an addition process for adding the access point 20-2 as described below to register the access point 20-2 in association with the conference as an extended access point in the conference information 111 (step S211).

Note that when the information terminal 30 is connected to the access point 20-2 before being disconnected from the access point 20-1, the processes of steps S209 and S210 will be performed before the processes of steps S207 and S208.

Also, note that when the information terminal 30 participating in the conference moves to an area where the communication range of the access point 20-1 that is registered as a basic access point and the communication range of the access point 20-2 that is not associated with the conference overlap, the processes of steps S207 and S208 for disconnecting the information terminal 30 from the access point 20-1 and notifying the information processing apparatus 10 of the disconnection will not be performed.

Note that the process sequence of FIG. 10 may also be implemented with respect to an information terminal 30 that does not establish connection with a plurality of access points 20 at the same time, for example.

Figure 11:
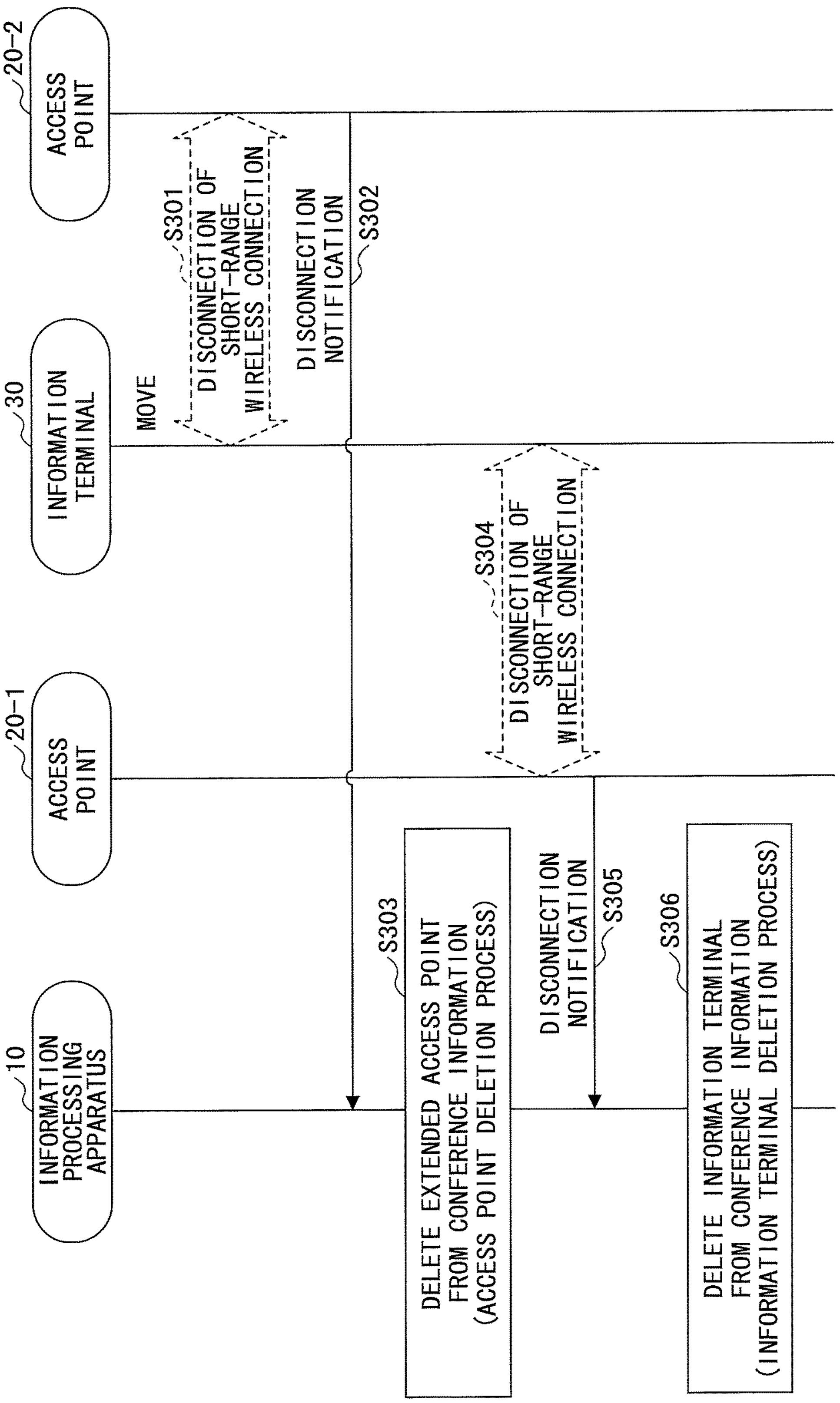
FIG. 11 is a sequence chart illustrating an example process sequence for reducing the conference area.

In the following, referring to FIG. 11, operations of the conference system 1 are described with respect to a case where a user carrying an information terminal 30 who wishes to leave a conference moves out of the communication range of an extended access point and thereafter moves out of the communication range of a base access point. FIG. 11 is a sequence chart illustrating an example process sequence for reducing the conference area.

When the user carrying the information terminal 30 moves out of the communication range of the access point 20-2, the short-range wireless communication established between the information terminal 30 and the access point 20-2 is disconnected (step S301). In step S302, the access point 20-2 notifies the information processing apparatus 10 that the short-range wireless communication with the information terminal 30 has been disconnected.

In step S303, the information processing apparatus 10 performs an access point deletion process as described below to delete the access point 20-2 registered as an extension access point for the conference from the conference information 111.

When the user carrying the information terminal 30 moves out of the communication range of the access point 20-1, the short-range wireless communication established between the information terminal 30 and the access point 20-1 is disconnected (step S304). In step S305, the access point 20-1 notifies the information processing apparatus 10 that the short-range wireless communication with the information terminal 30 has been disconnected.

In step S306, the information processing apparatus 10 performs an information terminal deletion process as described below to delete the information terminal 30 registered in association with the conference from the conference information 111.

Figure 12:
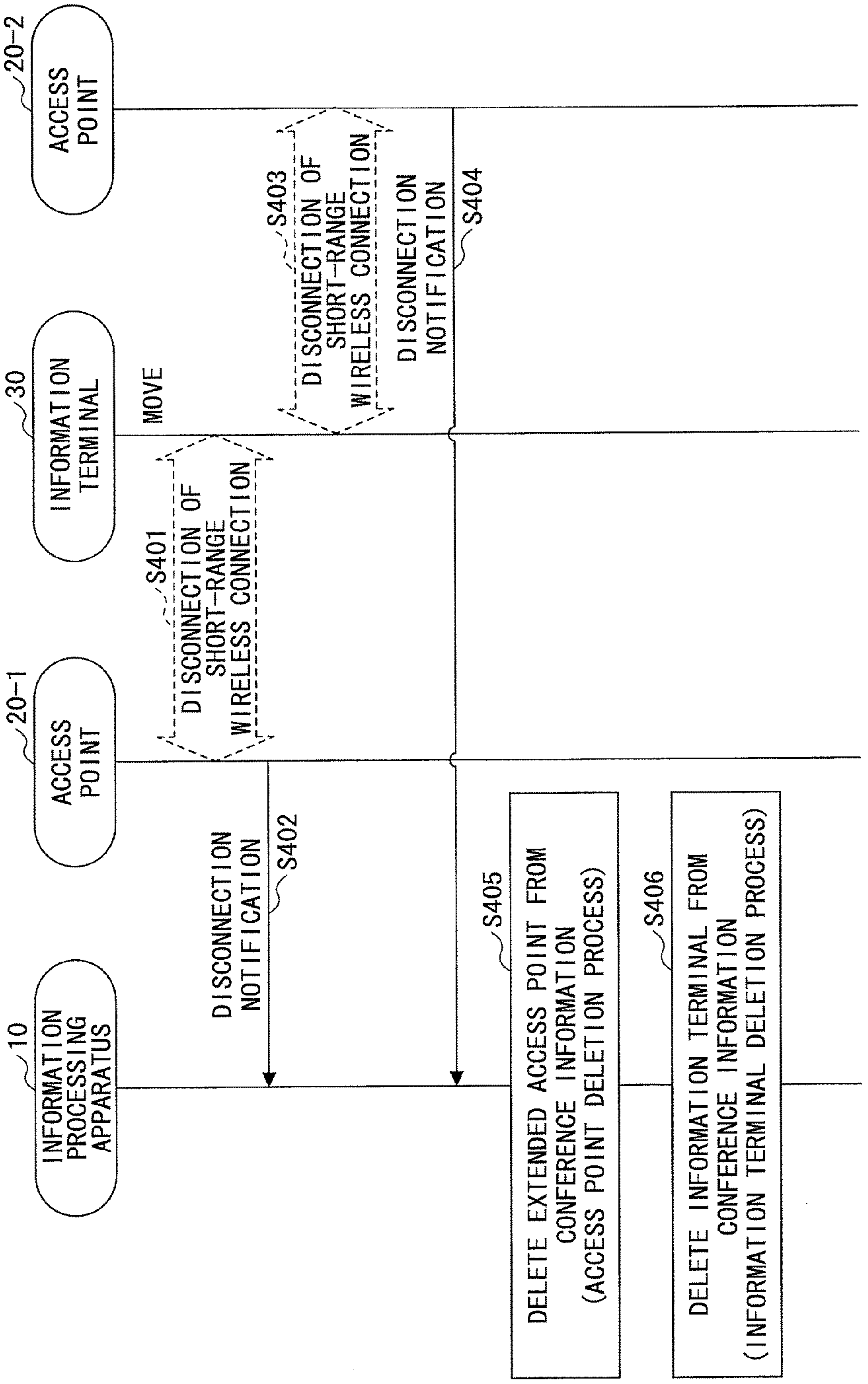
FIG. 12 is a sequence chart illustrating another example process sequence for reducing the conference area.

In the following, referring to FIG. 12, operations of the conference system 1 are described with respect to a case where a user carrying an information terminal 30 who wishes to leave a conference moves out of the communication range of the base access point and thereafter moves out of the communication range of the extended access point. FIG. 12 is a sequence chart illustrating another example process sequence for reducing the conference area.

When the user carrying the information terminal 30 moves out of the communication range of the access point 20-1 registered as a basic access point for a conference, the short-range wireless communication established between the information terminal 30 and the access point 20-1 is disconnected (step S401). In step S402, the access point 20-1 notifies the information processing apparatus 10 that the short-range wireless communication with the information terminal 30 has been disconnected.

When the user carrying the information terminal 30 moves out of the communication range of the access point 20-2 registered an extended access point for the conference, the short-range wireless communication established between the information terminal 30 and the access point 20-2 is disconnected (step S403). In step S404, the access point 20-2 notifies the information processing apparatus 10 that the short-range wireless communication with the information terminal 30 has been disconnected.

In step S405, the information processing apparatus 10 performs an access point deletion process as described below to delete the access point 20-2 registered as an extension access point for the conference from the conference information 111.

In step S406, the information processing apparatus 10 performs an information terminal deletion process as described below to delete the information terminal 30 associated with the conference from the conference information 111.

Figure 13:
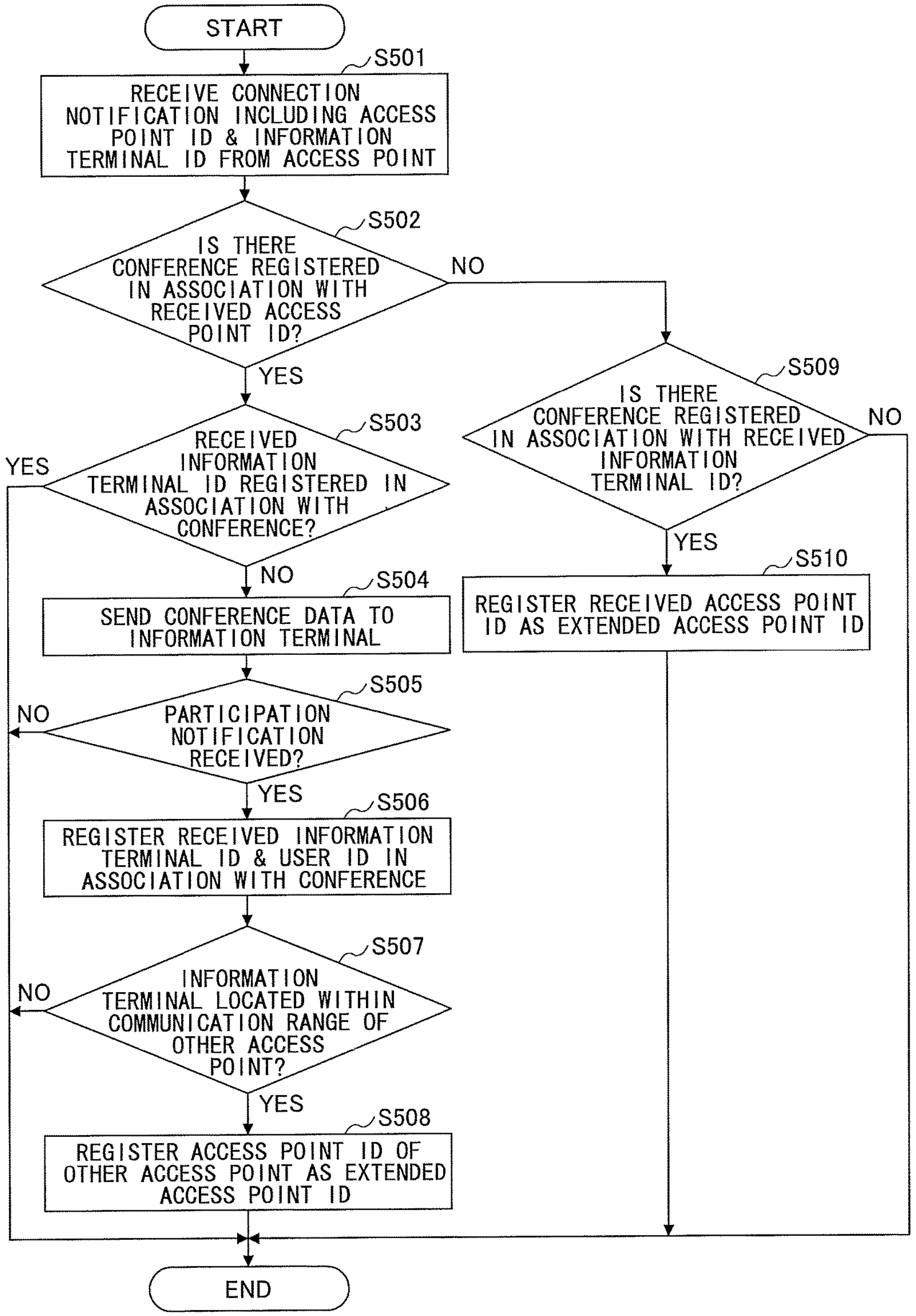
FIG. 13 is a flowchart illustrating an information terminal/access point addition process implemented by a conference management unit of the information processing apparatus.

In the following, referring to FIG. 13, the addition process for adding an information terminal 30 and/or an access point 20 is described in detail. The addition process is implemented by the conference management unit 12 when the information processing apparatus 10 according to the present embodiment receives a connection notification from an access point 20 indicating that a connection has been established with an information terminal 30. FIG. 13 is a flowchart illustrating example process steps of the addition process implemented by the conference management unit 12 for adding an information terminal 30 and/or an access point 20.

In step S501, the conference management unit 12 receives a connection notification including an access point ID and an information terminal ID from an access point 20.

In step S502, the conference management unit 12 refers to the conference information 111 to determine whether there is a conference having a registered conference time coinciding with the current time and having the received access point registered as a basic access point ID or an extended access point ID.

If there is a conference registered in association with the received access point ID (YES in step S502), the conference management unit 12 refers to the conference information 111 to determine whether the received information terminal ID is registered in association with the conference as a conference participating information terminal ID (step S503). If the received information terminal ID is registered in association with the conference as a conference participating information terminal ID (YES in step S503), the present addition process is ended. If the received information terminal ID is not registered in association with the conference (NO in step S503), the conference data delivering unit 13 sends conference data relating to the conference to the information terminal 30 (step S504).

In step S505, the conference management unit 12 determines whether it has received a conference participation notification including an access point ID, an information terminal ID, and a user ID from the information terminal 30. If a conference participation notification has not been received (NO in step S505), the present addition process is ended.

If a conference participation notification is received (YES in step S505), the conference management unit 12 registers the received information terminal ID and the user ID in association with the conference in the conference information 111 (step S506). Note that if no conference participation notification is received (NO in step S505), the present addition process is ended.

In step S507, the conference management unit 12 refers to the in-range information 112 to determine whether the information terminal 30 is located within the communication range of another access point 20.

If the information terminal 30 is not located within the communication range of another access point 20 (NO in step S507), the present addition process is ended.

If the information terminal 30 is located within the communication range of another access point 20 (YES in step S507), the conference management unit 12 registers the access point ID of the other access point 20 as an extended access point ID in the conference information 111 (step S508).

Note that if there is no conference registered in association with the received access point ID (NO in step S502), the conference management unit 12 refers to the conference information 111 to determine whether there is a conference having a registered conference time coinciding with the current time and having the received information terminal ID registered as a conference participating information terminal ID (step S509).

If there is no conference registered in association with the received information terminal ID (NO in step S509), the present addition process is ended.

If there is a conference that is associated with the received information terminal ID (YES in step S509), the conference management unit 12 registers the received access point ID as an extended access point ID in the conference information 111 (step S510).

Note that in the case where the information terminal 30 moves to an area where the communication range of the access point 20-1 registered as a basic access point for a conference and the communication range of the access point 20-2 that is not associated with the conference overlap, the process of step S508 is executed. In the case where the information terminal 30 located within the communication range of the access point 20-1 registered as a basic access point for a conference moves to the communication range of the access point 20-2 that is not associated with the conference, the process of step S510 is executed.

In the case where the process of step S508 or step S510 is executed, the access point 20-2 is registered as an extended access point. In this way, when another information terminal 30 subsequently establishes short-range wireless communication with the access point 20-2 during the conference time of the conference, the information processing apparatus 10 may transmit conference data relating to the conference to the other information terminal 30. Also, the information terminal 30 may be able to receive content associated with the conference from the information processing apparatus 10 via the access point 20-2.

Figure 14:
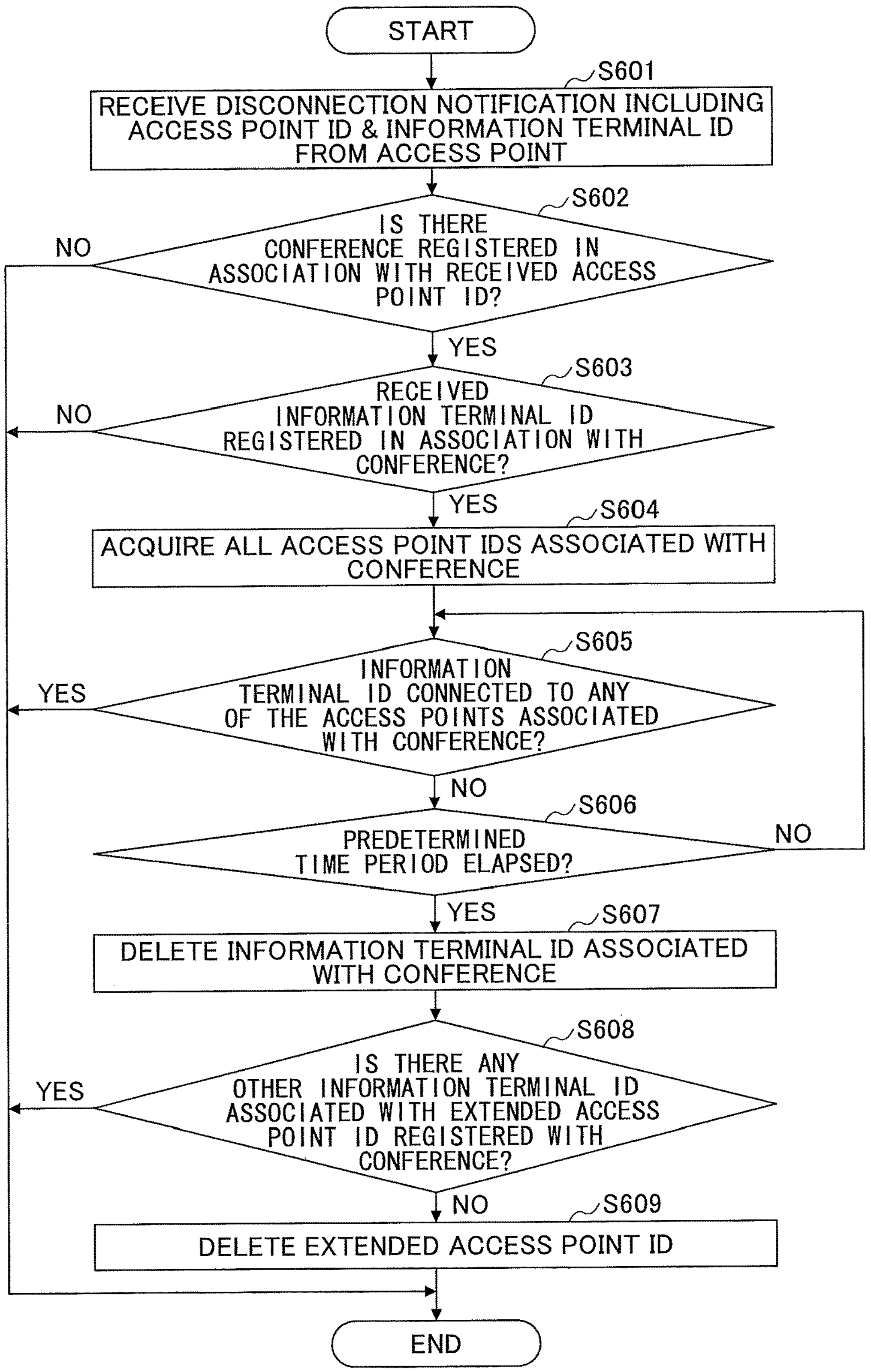
FIG. 14 is a flowchart illustrating an information terminal/access point deletion process implemented by the conference management unit.

In the following, referring to FIG. 14, the deletion process for deleting an information terminal 30 and/or an access point 20 is described in detail. The deletion process is implemented by the conference management unit 12 when the information processing apparatus 10 according to the present embodiment receives a disconnection notification from an access point 20 indicating that an information terminal 30 has been disconnected from the access point 20. FIG. 14 is a flowchart illustrating example process steps of the deletion process implemented by the conference management unit 12 for deleting an information terminal 30 and/or an access point 20.

In step S601, the conference management unit 12 receives a disconnection notification including an access point ID and an information terminal ID from an access point 20.

In step S602, the conference management unit 12 refers to the conference information 111 to determine whether there is a conference having a registered conference time coinciding with the current time and having the received access point registered as a basic access point ID or an extended access point ID.

If there is no conference registered in association with the received access point ID (NO in step S602), the present deletion process is ended.

If there is a conference registered in association with the received access point ID (YES in step S602), the conference management unit 12 refers to the conference information 111 to determine whether the received information terminal ID is registered in association with the conference as a conference participating information terminal ID (step S603).

If the received information terminal ID is not registered in association with the conference (NO in step S603), the present deletion process is ended.

If the received information terminal ID is registered in association with the conference as a conference participating information terminal ID (YES in step S603), the conference management unit 12 acquires all of the basic access point IDs and the extended access point IDs registered in association with the conference (step S604).

In step S605, the conference management unit 12 refers to the in-range information 112 to determine whether the received information terminal ID is registered in association with an access point ID corresponding to a basic access point ID or an extended access point ID associated with the conference. That is, the conference management unit 12 determines whether the information terminal 30 with the received information terminal ID is connected to an access point 20 associated with the conference.

If the received information terminal ID is registered in association with an access point ID that is associated with the conference (YES in step S605), the present deletion process is ended.

If the received information terminal ID is not registered in association with an access point ID that is associated with the conference (NO in step S605), the conference management unit 12 waits until a predetermined time period elapses in case the information terminal 30 moves into the communication range of another access point 20. That is, in step S606, the conference management unit 12 determines whether the predetermined time period has elapsed, and if not (NO in step S606), the conference management unit 12 repeats the process of step S605. When the predetermined time period has elapsed (YES in step S606), the conference management unit 12 determines that the information terminal 30 has left the conference and deletes the information terminal ID of the information terminal 30 from the conference participating information terminal IDs registered in association with the conference in the conference information 111 (step S607).

In step S608, the conference management unit 12 refers to the in-range information 112 to determine whether the other information terminal IDs registered in association with the access point ID that is registered as an external access point for the conference includes an information terminal ID of another information terminal 30 participating in the conference. If there is another information terminal 30 participating in the conference that is connected to the external access point (YES in step S608), the present deletion process is ended. If there is no other information terminal 30 participating in the conference that is connected to the external access point (NO in step S608), the conference management unit 12 deletes the access point ID of the external access point from the extended access point IDs registered in association with the conference in the conference information 111 (step S609).

Note that in a case where the information terminal 30 is capable of establishing connection with multiple access points 20 at the same time, the process of waiting until the predetermined time period elapses in step S606 may be omitted, for example. In this case, when the information terminal 30 moves to an area where the communication range of the access point 20-1 registered as a basic access point for the conference and the communication range of the access point 20-2 that is not associated with the conference overlap as in the example illustrated in FIG. 9, the access point ID of the access point 20-2 may be added as an extended access point for the conference.

Figure 15:
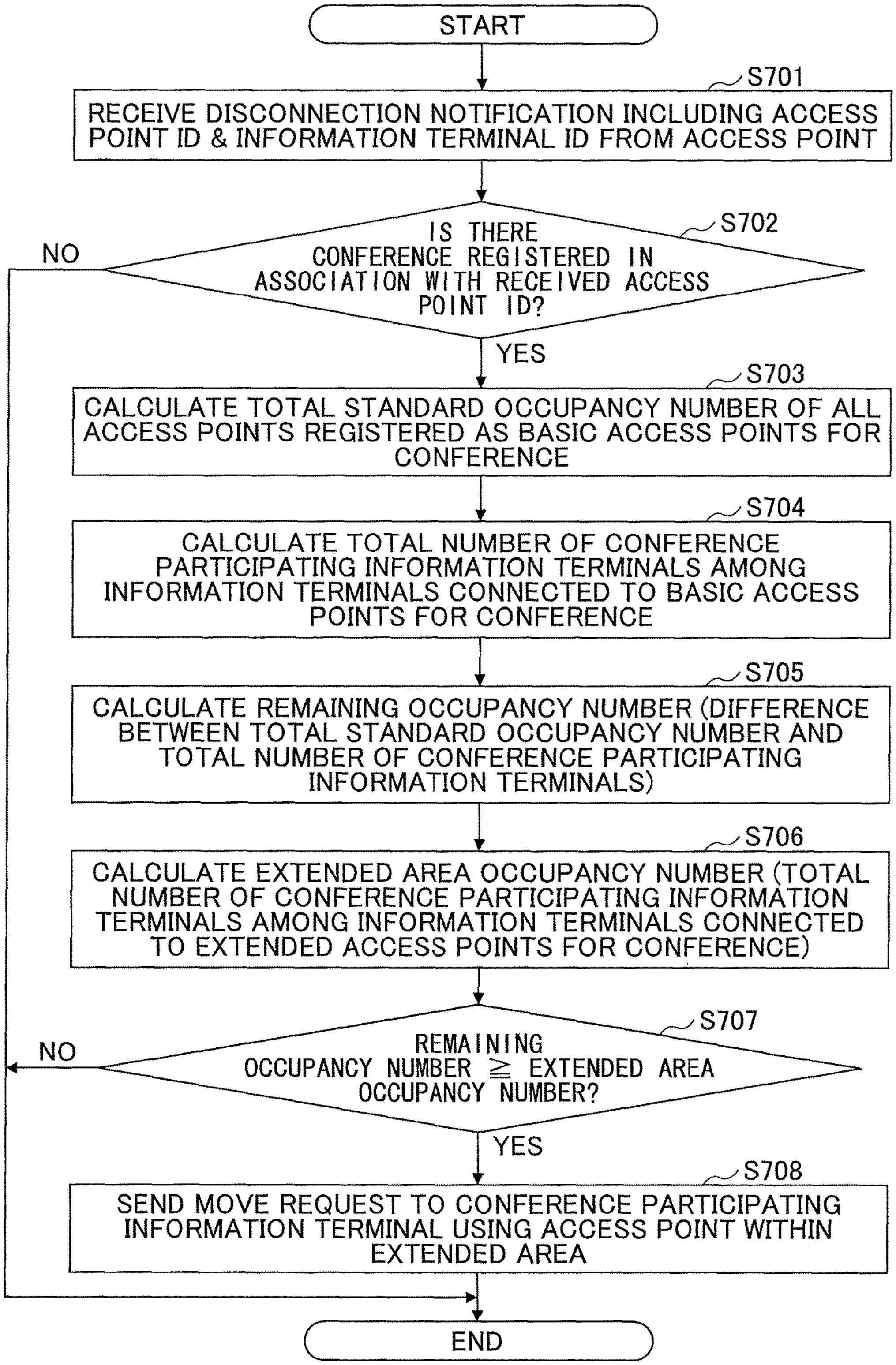
FIG. 15 is a flowchart illustrating a move request notification process implemented by the conference management unit.

In the following, referring to FIG. 15, a move request notification process implemented by the conference management unit 12 when the information processing apparatus 10 according to the present embodiment receives a disconnection notification from an access point 20 indicating that an information terminal 30 has been disconnected is described. FIG. 15 is a flowchart illustrating example process steps of the move request notification process implemented by the conference management unit 12.

In step S701, the conference management unit 12 receives a disconnection notification including an access point ID and an information terminal ID from an access point 20.

In step S702, the conference management unit 12 refers to the conference information 111 to determine whether there is a conference having a registered conference time coinciding with the current time and has the received access point ID registered as a basic access point ID.

If there is no conference registered in association with a basic access point ID that corresponds to the received access point ID (NO in step S702), the present notification process is ended.

If there is a conference registered in association with a basic access point ID that corresponds to the received access point ID (YES in step S702), the conference management unit 12 refers to the in-range information 112 to calculate a total standard occupancy number of all access points 20 registered as basic access points for the conference (step S703).

In step S704, the conference management unit 12 calculates the total number of information terminals 30 participating in the conference among the information terminals 30 that are connected to the access points 20 registered as basic access points for the conference.

In step S705, the conference management unit 12 calculates a remaining occupancy number, which corresponds to the difference between the total standard occupancy number calculated in step S703 and the total number of information terminals 30 calculated in step S704.

In step S706, the conference management unit 12 refers to the in-range information 112 to calculate an extended area occupancy number, which corresponds to the total number of conference participating information terminals 30 participating in the conference among the information terminals 30 that are connected to an access point 20 added as an extended access point for the conference but not connected to an access point 20 registered as a basic access point for the conference.

In step S707, the conference management unit 12 determines whether the remaining occupancy number is greater than or equal to the extended area occupancy number. If the remaining occupancy number is less than the extended area occupancy number (NO in step S707), the present notification process is ended. If the remaining occupancy number is greater than or equal to the extended area occupancy number (YES in step S707), the conference management unit 12 refers to the in-range information 112 and sends a move request notification to the information terminals 30 that are connected to an access point 20 added as an extended access point for the conference but not connected to an access point 20 that is registered as a basic access point for the conference (step S708).

Note that the information processing apparatus 10 may be configured to periodically perform the processes of step S703 and the subsequent process steps with respect to each conference that is currently held, and in this way, move request notifications may be sent to relevant information terminals 30.

For example, with respect to the conference information 111 of FIG. 7 and the in-range information 112 of FIG. 8, a conference with the conference ID "001" has the access point 20-1 ("AP20-1") and the access point 20-2 ("AP20-2") registered as basic access points for the conference, and as such, in step S703, the total standard occupancy number for the access points 20-1 and 20-2 registered as the basic access points is calculated as 4+4=8.

Also, it can be appreciated that information terminals 30A, 30B, 30C, and 30D are connected to the access points 20-1 and 20-2 corresponding to the basic access points for the conference with the conference ID "001", and all of the above information terminals 30A-30D are participating in the conference (i.e., their information terminal IDs are registered as conference participating information terminal IDs in association with the conference in the conference information 111). Thus, in step S704, it is determined that the total number of information terminals 30 participating in the conference that are connected to the access points 20-1 and 20-2 is 4.

In step S705, the remaining occupancy number is calculated as 8−4=4.

Also, it can be appreciated that information terminals 30E and 30F are connected to an access point 20-3 that has been added as an extended access point for the conference but are not connected to the access points 20-1 and 20-2 corresponding to the basic access points for the conference. Further, both of the above information terminals 30E and 30F are participating in the conference. Thus, in step S706, the extended area occupancy number is determined to be 2.

In step S707, because the remaining occupancy number is 4, and the extended area occupancy number is 2, it is determined that the remaining occupancy number is greater than the extended area occupancy number. Thus, in step S708, the conference management unit 12 sends move request notifications to the information terminals 30E and 30F that are participating in the conference using the access point 20-3 covering the extended area of the conference area.

Figure 16A:
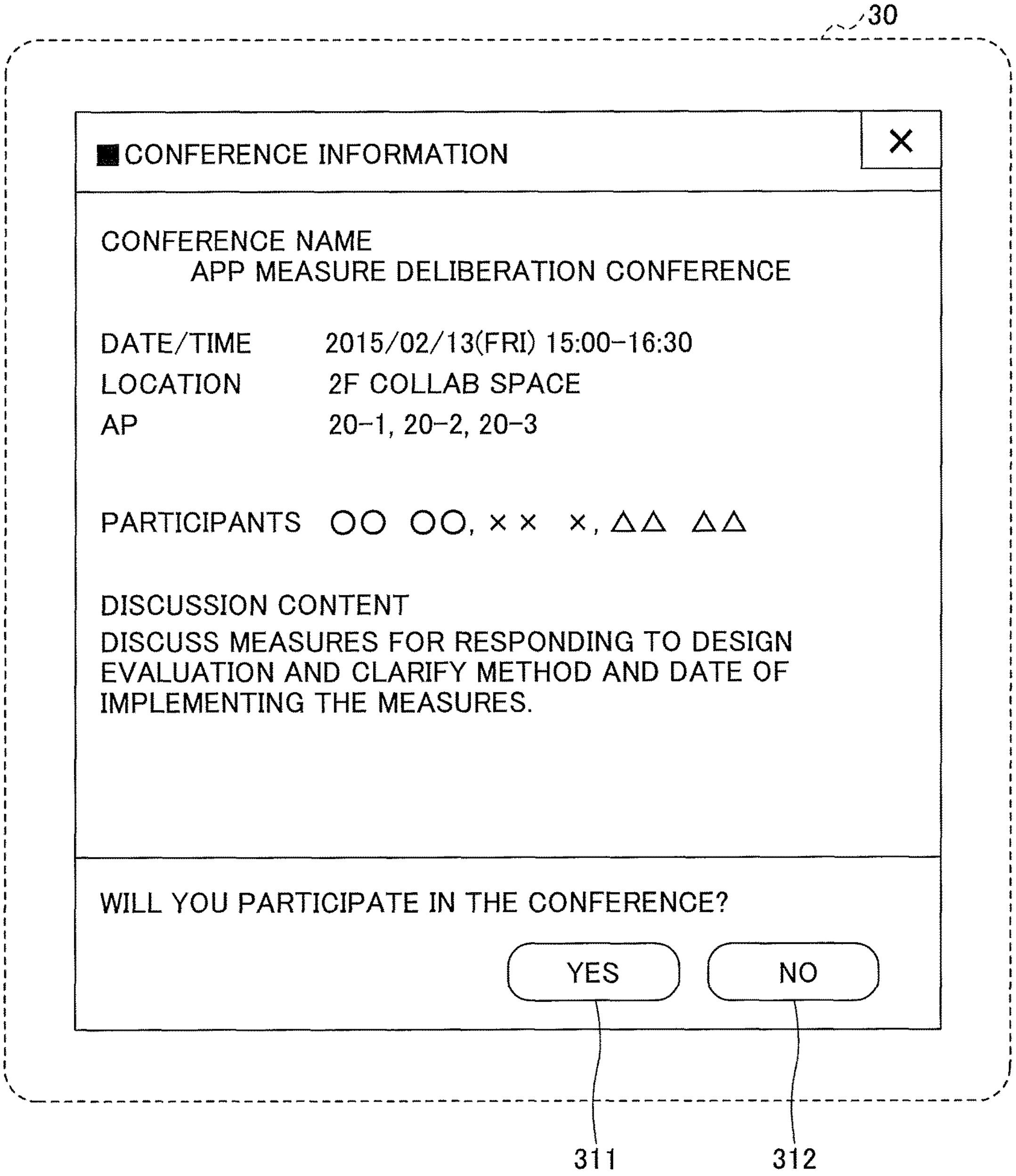
FIGS. 16A-16C are diagrams illustrating example display screens for displaying conference data on the information terminal.
Figure 16B:
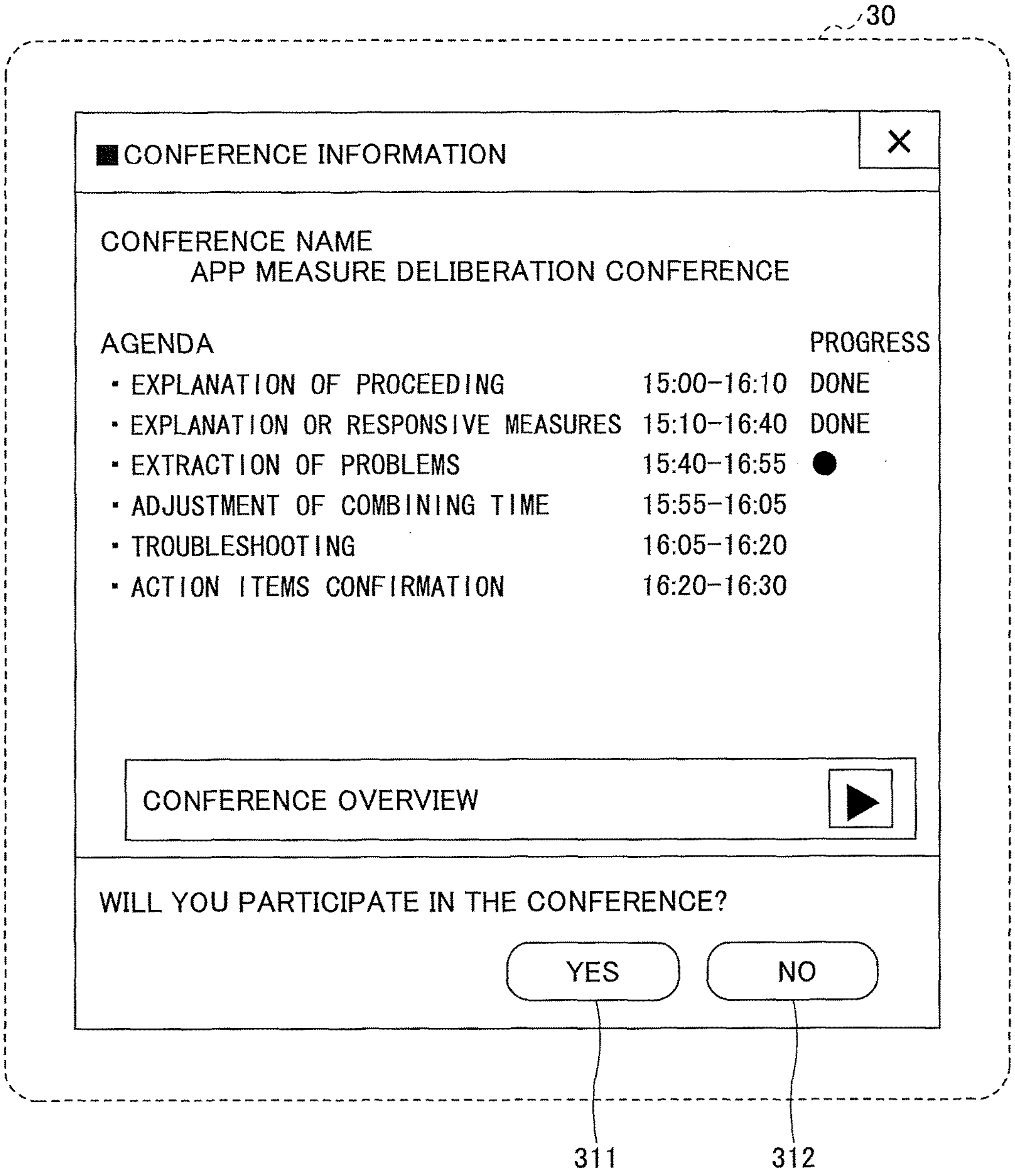
Figure 16C:

In the following, examples of display screens for displaying conference data on an information terminal 30 when the information terminal 30 establishes connection with an access point 20 that is registered as a basic access point or an extended access point for a conference are described. FIGS. 16A-16C illustrate example display screens for displaying conference data on the information terminal 30.

The display screen of FIG. 16A displays the conference name, the conference time (date/time), the conference location, the participants, and the discussion content extracted from the agenda. The display screen also includes a button 311 for participating in the conference. By pressing the button 311, the user of the information terminal 30 may be able to participate in the conference and view conference data such as handouts for the conference. Note that in some embodiments, the present display screen may be closed when the user presses a button 312 for declining to participate in the conference, or when the user carrying the information terminal 30 moves out of the communication range of the access point 20 such that the short-range wireless communication with the access point 20 is disconnected, for example.

The display screen of FIG. 16B displays discussion items extracted from the agenda and a time schedule. As the state of progress of the discussion items in the agenda changes during the conference, the change may be reflected on the display screen, for example.

The display screen of FIG. 16C displays results and action items for discussion items extracted from the topic. As the results and action items for the discussion items of the topic are updated during the meeting, the updated results and action items may be reflected on the display screen, for example.

Figure 17:
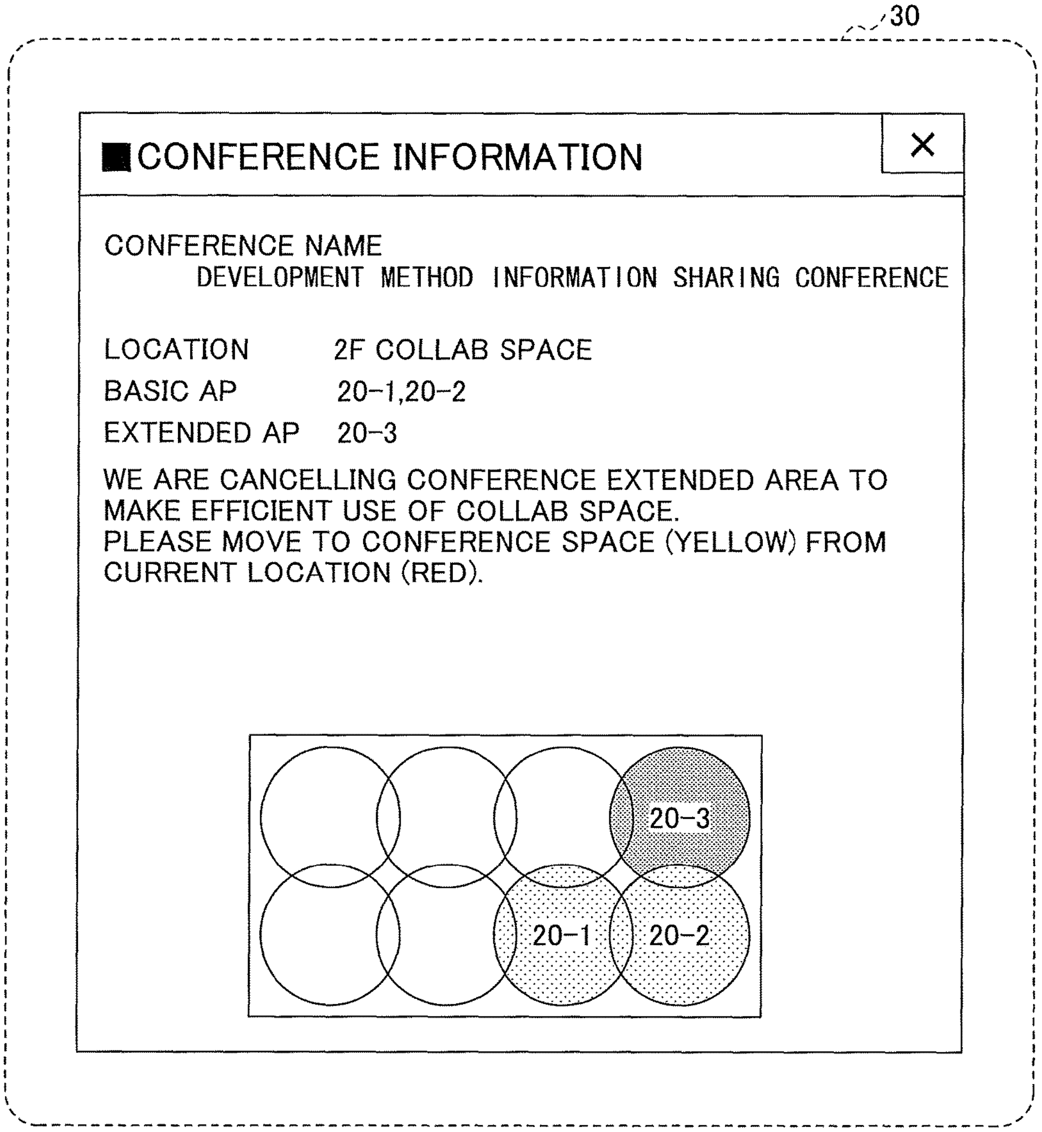
FIG. 17 is a diagram illustrating an example display screen for displaying a move request notification on the information terminal.

In the following, referring to FIG. 17, an example display screen to be displayed on an information terminal 30 when the information terminal 30 receives a move request notification from the information processing apparatus 10 is described. FIG. 17 illustrates an example display screen for displaying a move request notification on the information terminal 30.

The display screen of FIG. 17 displays the conference name, the conference location, the basic access point, the extended access point, and a message promoting the user of the information terminal 30 to move from the extended area. Note that in some embodiments, the present display screen may be closed when the information terminal 30 moves out of the communication range of the access point 20 that is registered as an extended access point for the conference and the short-range wireless communication with the access point is disconnected, for example.

<Modifications>

Note that in some embodiments, when the conference management unit 12 receives a disconnection notification from a basic access point indicating that an information terminal 30-1 participating in a conference has been disconnected (i.e., when the information terminal 30-1 is no longer within the communication range of the basic access point), the conference management unit 12 may refer to the in-range information 112 to determine whether the information terminal 30-1 is connected to another basic access point. If the information terminal 30-1 is not connected to another basic access point, the conference management unit 12 may be configured to perform process operations as described below. That is, the conference management unit 12 determines whether the following conditions are satisfied: (1) the information terminal 30-1 is connected to an access point 20-2 that corresponds to an extended access point for the conference; and (2) another information terminal 30 participating in the conference is connected to both the extended access point and the basic access point. If the above conditions are satisfied, the conference management unit 12 does not delete the information terminal 30-1 and the access point 20-2 associated with the conference from the conference information 111. If the above conditions are not satisfied, the conference management unit 12 deletes the information terminal 30-1 and the access point 20-2 associated with the conference from the conference information 111. In this way, for example, in a case where the user of the information terminal 30-1 moves out of the communication range of an access point 20-1 corresponding to a basic access point due to crowding of the conference area originally scheduled to be used, the user of the information terminal 30-1 may be able to participate in the conference using the access point 20-2 if there is another information terminal 30 participating in the conference that is located in an overlapping area where the communication range of the access point 20-1 and the communication range of the access point 20-2 overlap. On the other hand, if there is no other information terminal 30 participating in the conference that is connected to both the access point 20-1 and the access point 20-2, the conference management unit 12 may determine that the user of the information terminal 30-1 has left the conference.

Note that the system configurations according to the embodiments described above are merely illustrative examples, and a variety of other system configurations may be implemented according to various applications and objectives. For example, the information processing apparatus 10 may be configured by a plurality of information processing apparatuses.

Also, in the above described embodiments, a determination is made as to whether an information terminal ID received from an access point 20 is associated with a conference (e.g., FIG. 13). However, in other embodiments, determinations may be made based on a user ID. For example, a determination may be made as to whether a user ID transmitted from an information terminal 30 is associated with a conference.

Also, in the above-described embodiments, access points set up as basic access points and extended access points are used to deliver conference data. However, in other embodiments, access points that are associated with each other may be configured to be communicable with each other. For example, with respect to FIG. 7, the access point 20-1, the access point 20-2, and the access point 20-3 may be associated with each other such that information terminals and/or electronic devices (e.g., multifunction peripheral, printer, projector, display device, speaker, microphone, etc.) connected to the above access points 20-1 through 20-3 may be configured to be communicable with each other. On the other hand, the information terminals and/or electronic connected to the access points 20-1 through 20-3 may be unable to communicate with information terminals and/or electronic connected to an access point 20-5 that is not associated with the above access points 20-1 through 20-3, for example.

With such a configuration, transmission and reception of data relating to a given conference may be confined within a prescribed communication range corresponding to the conference area, and in this way, data security may be improved with respect to data handled in the conference, for example.

Although the present invention has been described above with reference to certain illustrative embodiments, the present invention is not limited to these embodiments, and numerous variations and modifications may be made without departing from the scope of the present invention.

What is claimed is:

1. A conference system comprising:

a first communication apparatus;

a second communication apparatus; and an information processing apparatus;

wherein the first communication apparatus and the second communication apparatus each include a short-range wireless communication unit configured to establish short-range wireless communication with an information terminal that is located within at least one of a first communication range of the first communication apparatus and a second communication range of the second communication apparatus; and a communication unit configured to notify the information processing apparatus of the information terminal that is located within at least one of the first communication range of the first communication apparatus and the second communication range of the second communication apparatus;

wherein the information processing apparatus includes a memory storing a program; and a processor configured to execute the program to implement a process of managing a conference area of a conference;

wherein the processor first receives a participation notification to participate in the conference from the information terminal via the first communication apparatus with the first communication range that covers the conference area of the conference and in response to receiving a notification from the second communication apparatus that the information terminal has entered the second communication range of the second communication apparatus, the processor implements a process to extend the conference area of the conference to include the information terminal that sent the participation notification via the first communication when present in the first communication range and that has entered the second communication range of the second communication apparatus.

2. The conference system according to claim 1, wherein the processor of the information processing apparatus further implements processes of managing the conference area of the conference and conference data relating to the conference; and transmitting the conference data to the information terminal that is located within the conference area of the conference.

3. The conference system according to claim 2, wherein the processor of the information processing apparatus further implements processes of managing the first communication apparatus and the conference data in association with the conference;

managing the information terminal in association with the conference upon receiving the participation notification to participate in the conference from the information terminal via the first communication apparatus;

managing the second communication apparatus in association with the conference upon receiving the notification from the second communication apparatus that the information terminal is located within the second communication range of the second communication apparatus; and transmitting the conference data to the information terminal via the first communication apparatus or the second communication apparatus associated with the conference.

4. The conference system according to claim 2, wherein the processor of the information processing apparatus further implements a process of transmitting the conference data to another information terminal that is located within the extended area of the conference area that has been extended.

5. The conference system according to claim 2, wherein the conference data includes at least one of an agenda, a handout, minutes, a topic, and a progress of the conference.

6. The conference system according to claim 1, wherein when the information terminal ceases to be located within the extended area covered by the second communication range of the second communication apparatus, the processor of the information processing apparatus implements a process of reducing the conference area of the conference to the first communication range of the first communication apparatus.

7. The conference system according to claim 1, wherein when the information terminal ceases to be located within the first communication range of the first communication apparatus, the processor of the information processing apparatus implements a process of reducing the conference area of the conference to the first communication range of the first communication apparatus.

8. The conference system according to claim 1, wherein when the information terminal ceases to be located within the first communication range of the first communication apparatus, the processor of the information processing apparatus implements processes of determining whether another information terminal that is participating in the conference is located within an overlapping area where the first communication range of the first communication apparatus and the second communication range of the second communication apparatus overlap; and reducing the conference area of the conference to the first communication range of the first communication apparatus if no other information terminal participating in the conference is located within the overlapping area.

9. The conference system according to claim 1, wherein the processor of the information processing apparatus further implements a process of transmitting a message for prompting one or more participating information terminals participating in the conference that are located within the second communication range of the second communication apparatus to move to the first communication range of the first communication apparatus depending on a number of the participating information terminals that are located within the first communication range of the first communication apparatus and a number of the participating information terminals that are located within the second communication range of the second communication apparatus.

10. A conference system comprising:

at least one information processing apparatus including a memory storing a program; and a processor configured to execute the program to implement a process of managing a conference area of a conference;

wherein the processor first receives a participation notification to participate in the conference from an information terminal via a first communication apparatus, which is connected to the conference system and has a first communication range that covers the conference area of the conference, and in response to receiving a notification from a second communication apparatus connected to the conference system that the information terminal has entered a second communication range of the second communication apparatus, the processor implements a process to extend the conference area of the conference to include the information terminal that sent the participation notification via the first communication when present in the first communication range and that has entered the second communication range of the second communication apparatus.

11. A non-transitory computer-readable medium storing a program that when executed causes an information processing apparatus to implement processes of:

managing a conference area of a conference;

receiving a participation notification to participate in the conference from an information terminal via a first communication apparatus connected to the information processing apparatus, the first communication apparatus having a first communication range that covers the conference area of the conference;

receiving a notification from a second communication apparatus, which is connected to the information processing apparatus, that the information terminal has entered a second communication range of the second communication apparatus; and extending the conference area of the conference, in response to receiving the notification from the second communication apparatus that the information terminal has entered the second communication range, to include the information terminal that sent the participation notification via the first communication when present in the first communication range and that has entered the second communication range of the second communication apparatus.

12. The non-transitory computer-readable medium according to claim 11, the program further causes the information processing apparatus to implement processes of managing the conference area of the conference and conference data relating to the conference; and transmitting the conference data to the information terminal that is located within the conference area of the conference.

13. The non-transitory computer-readable medium according to claim 12, wherein the program further causes the information processing apparatus to implement processes of managing the first communication apparatus and the conference data in association with the conference;

managing the information terminal in association with the conference upon receiving the participation notification to participate in the conference from the information terminal via the first communication apparatus;

managing the second communication apparatus in association with the conference upon receiving the notification from the second communication apparatus that the information terminal is located within the second communication range of the second communication apparatus; and transmitting the conference data to the information terminal via the first communication apparatus or the second communication apparatus associated with the conference.

14. The non-transitory computer-readable medium according to claim 12, wherein the program further causes the information processing apparatus to implement a process of transmitting the conference data to another information terminal that is located within the extended area of the conference area that has been extended.

15. The non-transitory computer-readable medium according to claim 12, wherein the conference data includes at least one of an agenda, a handout, minutes, a topic, and a progress of the conference.

16. The non transitory computer-readable medium according to claim 11, wherein when the information terminal ceases to be located within the extended area covered by the second communication range of the second communication apparatus, the program causes the information processing apparatus to implement a process of reducing the conference area of the conference to the first communication range of the first communication apparatus.

17. The non-transitory computer-readable medium according to claim 11, wherein when the information terminal ceases to be located within the first communication range of the first communication apparatus, the program causes the information processing apparatus to implement a process of reducing the conference area of the conference to the first communication range of the first communication apparatus.

18. The non-transitory computer-readable medium according to claim 11, wherein when the information terminal ceases to be located within the first communication range of the first communication apparatus, the program causes the information processing apparatus to implement processes of determining whether another information terminal that is participating in the conference is located within an overlapping area where the first communication range of the first communication apparatus and the second communication range of the second communication apparatus overlap; and reducing the conference area of the conference to the first communication range of the first communication apparatus if no other information terminal participating in the conference is located within the overlapping area.

19. The non-transitory computer-readable medium according to claim 11, wherein the program further causes the information processing apparatus to implement a process of transmitting a message for prompting one or more participating information terminals participating in the conference that are located within the second communication range of the second communication apparatus to move to the first communication range of the first communication apparatus depending on a number of the participating information terminals located within the first communication range of the first communication apparatus and a number of the participating information terminals located within the second communication range of the second communication apparatus.

* * * * *